US012730785B2

(12) United States Patent
Cheng et al.

(10) Patent No.: US 12,730,785 B2
(45) Date of Patent: Sep. 8, 2026

(54) COMPLETION OF DATA GAPS IN A DATASET

(71) Applicant: International Business Machines Corporation, Armonk, NY (US)

(72) Inventors: Min Cheng, Beijing (CN); Bo Chen Zhu, Xi'an (CN); Mai Zeng, Beijing (CN); Al Chakra, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/037,237

(22) Filed: Jan. 26, 2025

(65) Prior Publication Data

US 2026/0220102 A1 Jul. 30, 2026

(51) Int. Cl.
*G06F 16/00* (2019.01)
*G06F 16/215* (2019.01)

(52) U.S. Cl.
CPC .................................. *G06F 16/215* (2019.01)

(58) Field of Classification Search
None
See application file for complete search history.

(56) References Cited

U.S. PATENT DOCUMENTS 11,089,108 B2 8/2021 Shah et al.
12,190,215 B1 * 1/2025 Gupta .................... G06N 20/00
2020/0125433 A1 4/2020 Leverich et al.
2020/0320379 A1 * 10/2020 Watson .................. G06N 3/096
2023/0195715 A1 6/2023 Schleith et al.
2024/0161015 A1 * 5/2024 Patel ...................... G06N 20/00

FOREIGN PATENT DOCUMENTS

CN 117668728 A 3/2024
IN 202441066824 A 9/2024

OTHER PUBLICATIONS

Rafal et al. (DE-112021000251-T5), "Procedure For Selecting Records to Update an Artificial Intelligence Module", Sep. 8, 2022, 21 Pages. (Year: 2022).*
Shao et al., "Time series anomaly detection based on unsupervised adversarial learning", Journal of Nanjing University(Natural Sciences), 2021, pp. 1042-1052.

* cited by examiner

*Primary Examiner* — Bai D Vu
(74) *Attorney, Agent, or Firm* — CHIP LAW GROUP

(57) ABSTRACT

Completion of data gaps in a dataset is provided and includes retrieving first input data that includes one or more metrics associated with one or more user devices. One or more rules are applied to the first input data and the first input data is classified into a set of groups based on the application of the one or more rules. A presence of a first multiplicative relationship between a first metric of the one or more metrics and a second metric of the one or more metrics is determined and the second metric is modified based on the determination of the presence of the first multiplicative relationship. Based on the modified second metric, a first portion of a training dataset is generated and outputted.

20 Claims, 13 Drawing Sheets

800

Retrieve first input data that includes one or more metrics associated with one or more user devices 802

Apply one or more rules on first input data 804

Classify first input data into set of groups based on application of one or more rules on first input data 806

Determine absence of first multiplicative relationship between first metric of one or more metrics and second metric of one or more metrics 808

Generate first training dataset based on determination of absence of first multiplicative relationship 810

Output first training dataset 812

| Timestamp | CPU Utilization | Memory Utilization |
|---|---|---|
| 10:00 AM | 30% | 4GB of 16GB |
| 10:01 AM | 45% | 8GB of 16GB |
| 10:02 AM | 60% | 8GB of 16GB |
| 10:03 AM | 75% | 10GB of 16GB |
| 10:04 AM | 90% | 12GB of 16GB |
| 10:05 AM | 100% | 16GB of 16GB |

COMPLETION OF DATA GAPS IN A DATASET

BACKGROUND

The disclosure relates to the completion of data gaps and more particularly, to the completion of data gaps in a dataset.

Real-time data anomaly detection has become a crucial component in various fields, particularly in information technology (IT) operations, finance, and healthcare, where timely identification of irregularities can prevent significant operational disruptions and financial losses. In IT operations, effective anomaly detection enhances system reliability, improves performance, and enables timely responses to potential threats. In finance, the anomaly detection plays a vital role in detecting unwanted transactions by identifying unusual spending patterns, while in healthcare, the anomaly detection monitors patient vitals to quickly identify medical emergencies. In manufacturing, the anomaly detection predicts equipment failures by analyzing sensor data, helping to minimize downtime and reduce maintenance costs. By identifying anomalies early, organizations can mitigate risks, optimize operations, and improve overall decision-making, leading to better resource allocation and enhanced operational efficiency.

Specifically, the process of real-time data anomaly detection in IT operations involves several key steps. The process begins with data collection, where operational data is gathered, including metrics related to system performance, logs, and events. The operational data is then subjected to data preprocessing, which cleans and organizes the operational data to ensure its quality and relevance. Following this, feature data extraction identifies significant characteristics of the operational data that represent the system's normal state. After feature extraction, model training utilizes machine learning techniques to develop an anomaly detection model tailored to the specific operational environment. Finally, the trained model is applied to real-time data streams, enabling continuous monitoring and immediate identification of anomalies. This structured approach allows IT teams to maintain system performance and swiftly address any irregularities that arise.

SUMMARY

In various embodiments of the disclosure, a computer-implemented method for completion of data gaps in a dataset is described. The computer-implemented method includes retrieving, by a computer, first input data including one or more metrics associated with one or more user devices. The computer-implemented method further includes applying, by the computer, one or more rules on the first input data. The computer-implemented method further includes classifying, by the computer, the first input data into a set of groups based on the application of the one or more rules on the first input data. The computer-implemented method further includes determining, by the computer, a presence of a first multiplicative relationship between a first metric of the one or more metrics and a second metric of the one or more metrics. The computer-implemented method further includes modifying, by the computer, the second metric based on the determination of the presence of the first multiplicative relationship. The computer-implemented method further includes generating, by the computer, a first portion of a first training dataset based on the modified second metric. The first portion of the first training dataset is exclusive of the first metric. The computer-implemented method further includes outputting, by the computer, the first portion of the first training dataset.

In various embodiments of the disclosure, a computer system for completion of data gaps in a dataset is described. The computer system includes a processor set, one or more computer-readable storage media, and program instructions stored on the one or more computer-readable storage media. The program instructions are executable by the processor set and cause the processor set to retrieve first input data that includes one or more metrics associated with one or more user devices. The program instructions further cause the processor set to apply one or more rules on the first input data. The program instructions further cause the processor set to classify the first input data into a set of groups based on the application of the one or more rules on the first input data. The program instructions further cause the processor set to determine a presence of a first multiplicative relationship between a first metric of the one or more metrics and a second metric of the one or more metrics. The program instructions further cause the processor set to modify the second metric based on the determination of the presence of the first multiplicative relationship. The program instructions further cause the processor set to generate a training dataset based on the modified second metric. The training dataset is exclusive of the first metric. The program instructions further cause the processor set to train a first machine learning (ML) model based on the training dataset. The first ML model is trained to predict a first value of the first metric. The program instructions further cause the processor set to output the trained first ML model.

In various embodiments of the disclosure, a computer-program product for completion of data gaps in a dataset is described. The computer program product includes one or more computer-readable storage media and program instructions stored in the one or more computer-readable storage media to perform operations that include retrieving first input data that includes one or more metrics associated with one or more user devices. The operations further include applying one or more rules on the first input data. The operations further include classifying the first input data into a set of groups based on the application of the one or more rules on the first input data. The operations further include determining an absence of a first multiplicative relationship between a first metric of the one or more metrics and a second metric of the one or more metrics. The operations further include generating a training dataset based on the determination of the absence of the first multiplicative relationship. The training dataset is inclusive of the first metric. The operations further include outputting the training dataset.

Additional technical features and benefits are realized through the techniques of the disclosure. Embodiments and aspects of the disclosure are described in detail herein and are considered a part of the claimed subject matter. For a better understanding, refer to the detailed description and the drawings.

BRIEF DESCRIPTION OF THE DRAWINGS

The following description will provide details of preferred embodiments with reference to the following figures, wherein.

DETAILED DESCRIPTION

Figure 1:
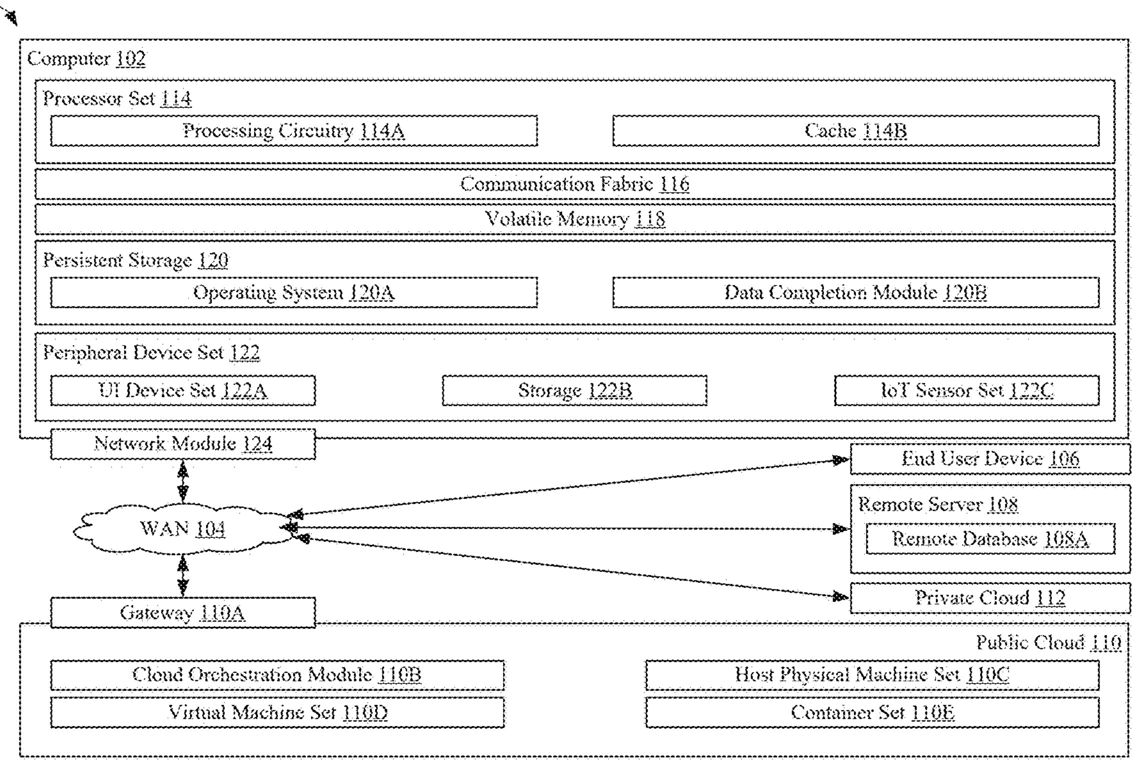
FIG. 1 is a diagram that illustrates a computing environment for completion of data gaps in a dataset, in accordance with an embodiment of the disclosure.

Artificial Intelligence for IT Operations (AIOps) represents a transformative approach in the realm of information technology, leveraging advanced artificial intelligence (AI) and machine learning (ML) techniques to optimize and enhance IT operations. In an increasingly complex digital landscape, organizations face the challenge of managing vast amounts of data generated by their IT infrastructure. AIOps addresses this challenge by streamlining various operational processes, including monitoring, troubleshooting, performance management, and anomaly detection. By integrating AI and ML into IT operations, AIOps enables organizations to automate routine tasks, improve operational efficiency, and enhance decision-making capabilities, ultimately leading to more resilient and responsive IT environments.

The implementation of AIOps for real-time data anomaly detection involves several critical steps that ensure the effective monitoring and management of IT systems. In the context of IT operations, effective anomaly detection can lead to enhanced system reliability, improved performance, and timely responses to potential threats. By identifying anomalies, organizations can detect issues before they escalate into significant problems, ultimately reducing downtime and associated costs. For instance, early detection of unusual spikes in network traffic can help prevent security breaches, while monitoring server performance can lead to proactive maintenance and resource allocation.

Specifically, the process of real-time data anomaly detection in IT operations involves several key steps. The process begins with data collection, where operational data is gathered, including metrics related to system performance, logs, and events. The operational data is then subjected to data preprocessing, which cleans and organizes the operational data to ensure its quality and relevance. Following this, feature data extraction identifies significant characteristics of the operational data that represent the system's normal state. After feature extraction, model training utilizes machine learning techniques to develop an anomaly detection model tailored to the specific operational environment. Finally, the trained model is applied to real-time data streams, enabling continuous monitoring and immediate identification of anomalies. This structured approach allows IT teams to maintain system performance and swiftly address any irregularities that arise.

When leveraging AIOps for anomaly detection, the approach can be tailored to focus on either a single metric or a combination of multiple metrics. In the case of single metric analysis, the behavior of each metric is monitored independently, and anomalies are detected based on predefined thresholds or historical data comparisons. For instance, CPU utilization or memory utilization can be monitored as individual metrics to identify unusual patterns. Alternatively, grouped metrics can be used, where the behavior and relationships among a group of metrics are considered simultaneously. This approach can provide a more comprehensive view of system performance, as seen in examples such as combining CPU utilization, memory utilization, and network traffic as grouped metrics. By selecting the appropriate approach, IT teams can refine their anomaly detection strategies and improve the accuracy of their insights.

However, while performing anomaly detection, data loss can significantly hinder the ability to identify critical anomalies. One common cause of data loss is data acquisition issues. For example, if a temperature sensor in a manufacturing facility fails, it may stop sending data altogether. This could lead to gaps in the data that are crucial for monitoring equipment health. Similarly, network interruptions can occur during extreme weather events, causing data from remote sensors to be temporarily unavailable. These disruptions can prevent organizations from detecting anomalies, potentially leading to equipment failures or safety hazards.

One more significant cause for the data loss is data transmission issues. For instance, in a large-scale IoT deployment, data packets transmitted over wireless networks may be lost due to interference or congestion. If a data packet containing critical information about system performance is lost, it can create inconsistencies in the data. Additionally, failures in storage devices, such as hard drive failure in a data center, can result in the loss of valuable data collected over time. These transmission-related challenges can lead to incomplete datasets, making it difficult for anomaly detection algorithms to accurately identify deviations from normal behavior.

Finally, data storage and processing issues can also lead to significant data loss. For example, a disk failure in a database server can result in the permanent loss of time series data, which is crucial for trend analysis and anomaly detection. Moreover, human errors during data cleaning operations, such as mistakenly deleting relevant data points or incorrectly applying transformations, can further exacerbate the problem. Algorithm errors in data processing, such as bugs in the code that handle the data, can lead to corrupted datasets.

Addressing these issues is critical for organizations to ensure the integrity of their data and improve the reliability of their anomaly detection efforts. Data completion offers several advantages that enhance data quality and usability. The data completion improves the accuracy of analyses and decision-making by filling in missing values, leading to more reliable insights. The data completion further enhances the overall integrity of datasets, ensuring that they are more comprehensive and representative of the underlying phenomena. Furthermore, the data completion can streamline processes by reducing the need for manual data entry or correction, saving time and resources. Also, the data completion facilitates better machine learning model performance, as complete datasets often yield more robust and accurate predictions. Finally, the data completion can improve user experience by providing more complete information, enabling users to make informed decisions without encountering gaps in data.

Traditional methods for data completion often face significant challenges due to their computational complexity, which makes them impractical for large datasets or real-time applications. The traditional methods for data completion are time-consuming for the computing systems and they rely on high-end GPUs for the data completion. Their reliance on the high-end GPUs increases the cost of the data completion and hence increases the overall cost of the anomaly detection. Additionally, these traditional methods are prone to overfitting, particularly when utilizing complex models with numerous parameters, leading to poor generalization and inaccuracies in both data imputation and subsequent analyses. Furthermore, traditional techniques frequently struggle to capture complex patterns and relationships between the metrics in the data that reflect the underlying dynamics of the data. Together, these limitations highlight the need for an improved approach to data completion.

The disclosed system utilizes multiplicative relationships between the metrics of the data to generate a training dataset for training a machine learning (ML) model for completion of data gaps in a dataset. The multiplicative relationships between the metrics indicate the patterns and relationships between the metrics of the data and therefore can be utilized for generating a high-quality training dataset. The generated high-quality training dataset refers to the dataset that is consistent, complete, reliable, and covers the multiplicative relationships between the metrics of the data.

The generated high-quality training dataset also reduces the processing time of the computing systems for training the machine learning (ML) model for performing data completion since the generated high-quality training dataset (generated by the disclosed system) already covers the multiplicative relationships between the metrics of the data. Therefore, the high-quality training dataset generated by the disclosed system reduces the processing time of the computing system and computing resources for performing data completion. Further, the disclosed system increases the accuracy of the process of anomaly detection by ensuring that the data is consistent and complete.

The disclosed system further eliminates the need for high-end GPUs by reducing the processing time of the computing system and the utilization of the computing resources thereby, reducing the cost of the data completion. Moreover, the disclosed system ensures that the multiplicative relationships between all combinations of the metrics in the data are covered before the generation of the high-quality training dataset. This ensures that the data completed by the trained ML model is accurate, reliable, and less prone to errors.

The disclosed system further increases the performance (accuracy) of the ML model that is trained for performing the data completion by ensuring that the multiplicative relationships between all combinations of the metrics in the data are covered before the generation of the high-quality training dataset. The disclosed system further eliminates the risks related to the overfitting of the ML model in performing data completion by utilizing a combination of conditions while generating the high-quality training dataset and in the training stage of the ML model. Therefore, the disclosed system solves the problems associated with the traditional methods.

In various embodiments of the disclosure, a computer-implemented method for completion of data gaps in a dataset is described. The computer-implemented method includes retrieving, by a computer, first input data including one or more metrics associated with one or more user devices. The computer-implemented method further includes applying, by the computer, one or more rules on the first input data. The computer-implemented method further includes classifying, by the computer, the first input data into a set of groups based on the application of the one or more rules on the first input data. The computer-implemented method further includes determining, by the computer, a presence of a first multiplicative relationship between a first metric of the one or more metrics and a second metric of the one or more metrics. The computer-implemented method further includes modifying, by the computer, the second metric based on the determination of the presence of the first multiplicative relationship. The computer-implemented method further includes generating, by the computer, a first portion of a first training dataset based on the modified second metric. The first portion of the first training dataset is exclusive of the first metric. The computer-implemented method further includes outputting, by the computer, the first portion of the first training dataset.

In various embodiments of the disclosure, the computer-implemented method further includes training, by the computer, a first machine learning (ML) model based on the first portion of the first training dataset. The first ML model is trained to predict a first value of the first metric. The computer-implemented method further includes outputting, by the computer, the trained first ML model.

In various embodiments of the disclosure, the computer-implemented method further includes predicting, by the computer, the first value of the first metric based on the trained first ML model. The computer-implemented method further includes determining, by the computer, a first variance value for the trained first ML model based on the predicted first value of the first metric and a second value of the first metric. The computer-implemented method further includes comparing, by the computer, the first variance value with a variance threshold. The computer-implemented method further includes determining, by the computer, the first variance value is less than or equal to the variance threshold based on the comparison. The computer-implemented method further includes outputting, by the computer, the first ML model based on the determination that the first variance value is less than or equal to the variance threshold.

In various embodiments of the disclosure, the computer-implemented method further includes determining, by the computer, the first variance value is greater than the variance threshold based on the comparison. The computer-implemented method further includes determining, by the computer, a presence of a second multiplicative relationship between the second metric and a third metric of the one or more metrics based on the determination that the first variance value is greater than the variance threshold. The computer-implemented method further includes modifying, by the computer, the third metric based on the determination of the presence of the second multiplicative relationship. The computer-implemented method further includes generating, by the computer, a second portion of the first training dataset based on the modified third metric. The second portion of the first training dataset is exclusive of the second metric. The computer-implemented method further includes training, by the computer, the first ML model based on the second portion of the first training dataset. The first ML model is trained to predict a third value of the second metric.

In various embodiments of the disclosure, the computer-implemented method further includes predicting, by the computer, the third value of the second metric based on the trained first ML model. The computer-implemented method further includes determining, by the computer, a second variance value for the trained first ML model based on the predicted third value of the second metric and a fourth value of the second metric. The computer-implemented method further includes determining, by the computer, the second variance value is less than or equal to the variance threshold. The computer-implemented method further includes outputting, by the computer, the first ML model based on the determination that the second variance value is less than or equal to the variance threshold.

In various embodiments of the disclosure, the computer-implemented method further includes determining, by the computer, the second variance value is greater than the first variance value. The computer-implemented method further includes outputting, by the computer, the first ML model based on the determination that the second variance value is greater than the first variance value.

In various embodiments of the disclosure, the computer-implemented method further includes receiving, by the computer, second input data including at least one metric associated with a specific user device. The one or more metrics are inclusive of the at least one metric. The one or more user devices are inclusive of the specific user device. The computer-implemented method further includes identifying, by the computer, one or more missing values in the second input data. The computer-implemented method further includes applying, by the computer, the trained first ML model to the second input data. The computer-implemented method further includes generating, by the computer, modified second input data based on the application of the first ML model to the second input data. The modified second input data includes one or more values corresponding to the one or more missing values. The computer-implemented method further includes outputting, by the computer, the modified second input data.

In various embodiments of the disclosure, the computer-implemented method further includes applying, by the computer, a second ML model to the modified second input data. The computer-implemented method further includes detecting, by the computer, an anomaly associated with the specific user device based on the application of the second ML model to the modified second input data. The computer-implemented method further includes determining, by the computer, anomaly data associated with the specific user device based on the detected anomaly. The computer-implemented method further includes outputting, by the computer, the determined anomaly data.

In various embodiments of the disclosure, the computer-implemented method further includes retrieving, by the computer, a set of anomalies associated with each user device of the one or more user devices. The set of anomalies is inclusive of the detected anomaly. The computer-implemented method further includes generating, by the computer, a second training dataset based on the one or more metrics and the set of anomalies associated with each user device of the one or more user devices. The computer-implemented method further includes training, by the computer, the second ML model based on the second training dataset.

In various embodiments of the disclosure, the computer-implemented method further includes applying, by the computer, a third ML model to each group of the set of groups. The computer-implemented method further includes determining, by the computer, one of the presence or the absence of the first multiplicative relationship based on the application of the third ML model to each group of the set of groups.

In various embodiments of the disclosure, the computer-implemented method further includes applying, by the computer, one or more data processing operations to the first input data. The computer-implemented method further includes classifying, by the computer, each metric of the one or more metrics into one of a normal metric or an abnormal metric based on the application of the one or more data processing operations. The computer-implemented method further includes classifying, by the computer, the first input data into the set of groups based on the normal metric.

In various embodiments of the disclosure, the computer-implemented method further includes determining, by the computer, the one or more metrics are associated with a first set of metrics. The computer-implemented method further includes classifying, by the computer, the first input data into the set of groups based on the determination that the one or more metrics are associated with the first set of metrics.

In various embodiments of the disclosure, the computer-implemented method further includes determining, by the computer, the one or more metrics are associated with a second set of metrics. The second set of metrics is different from the first set of metrics. The computer-implemented method further includes determining, by the computer, a set of features associated with each metric of the one or more metrics based on the determination that the one or more metrics are associated with the second set of metrics. The set of features includes a transaction rate of each metric of the one or more metrics and a type of each metric of the one or more metrics. The computer-implemented method further includes classifying, by the computer, the first input data into the set of groups based on the set of features associated with each metric of the one or more metrics.

In various embodiments of the disclosure, a computer system for completion of data gaps in a dataset is described. The computer system includes a processor set, one or more computer-readable storage media, and program instructions stored on the one or more computer-readable storage media. The program instructions are executable by the processor set and cause the processor set to retrieve first input data that includes one or more metrics associated with one or more user devices. The program instructions further cause the processor set to apply one or more rules on the first input data. The program instructions further cause the processor set to classify the first input data into a set of groups based on the application of the one or more rules on the first input data. The program instructions further cause the processor set to determine a presence of a first multiplicative relationship between a first metric of the one or more metrics and a second metric of the one or more metrics. The program instructions further cause the processor set to modify the second metric based on the determination of the presence of the first multiplicative relationship. The program instructions further cause the processor set to generate a training dataset based on the modified second metric. The training dataset is exclusive of the first metric. The program instructions further cause the processor set to train a first machine learning (ML) model based on the training dataset. The first ML model is trained to predict a first value of the first metric. The program instructions further cause the processor set to output the trained first ML model.

In various embodiments of the disclosure, the program instructions further cause the processor set to receive second input data that includes at least one metric associated with a specific user device. The one or more metrics are inclusive of the at least one metric. The one or more user devices are inclusive of the specific user device. The program instructions further cause the processor set to identify one or more missing values in the second input data. The program instructions further cause the processor set to apply the trained first ML model to the second input data. The program instructions further cause the processor set to generate modified second input data based on the application of the first ML model to the second input data. The modified second input data includes one or more values corresponding to the one or more missing values. The program instructions further cause the processor set to output the modified second input data.

In various embodiments of the disclosure, the program instructions further cause the processor set to apply a second ML model to the modified second input data. The program instructions further cause the processor set to detect an anomaly associated with the specific user device based on the application of the second ML model to the modified second input data. The program instructions further cause the processor set to determine anomaly data associated with the specific user device based on the detected anomaly. The program instructions further cause the processor set to output the anomaly data.

In various embodiments of the disclosure, the program instructions further cause the processor set to apply a third ML model to each group of the set of groups. The program instructions further cause the processor set to determine the presence of the first multiplicative relationship based on the application of the third ML model to each group of the set of groups.

In various embodiments of the disclosure, the program instructions further cause the processor set to determine the one or more metrics are associated with a first set of metrics. The program instructions further cause the processor set to classify the first input data into the set of groups based on the determination that the one or more metrics are associated with the first set of metrics.

In various embodiments of the disclosure, the program instructions further cause the processor set to determine the one or more metrics are associated with a second set of metrics, wherein the second set of metrics is different from the first set of metrics. The program instructions further cause the processor set to determine a set of features associated with each metric of the one or more metrics based on the determination that the one or more metrics are associated with the second set of metrics. The set of features includes a transaction rate of each metric of the one or more metrics and a type of each metric of the one or more metrics. The program instructions further cause the processor set to classify the first input data into the set of groups based on the set of features associated with each metric of the one or more metrics.

In various embodiments of the disclosure, a computer-program product for completion of data gaps in a dataset is described. The computer program product includes one or more computer-readable storage media and program instructions stored in the one or more computer-readable storage media to perform operations that include retrieving first input data that includes one or more metrics associated with one or more user devices. The operations further include applying one or more rules on the first input data. The operations further include classifying the first input data into a set of groups based on the application of the one or more rules on the first input data. The operations further include determining an absence of a first multiplicative relationship between a first metric of the one or more metrics and a second metric of the one or more metrics. The operations further include generating a training dataset based on the determination of the absence of the first multiplicative relationship. The training dataset is inclusive of the first metric. The operations further include outputting the training dataset.

Various aspects of the disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks are performed in reverse order, as a single integrated operation, concurrently, or in a manner at least partially overlapping in time.

A computer program product embodiment ("CPP embodiment" or "CPP") is a term used in the disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium is an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the disclosure, is not to be construed as storage in the form of transitory signals per se, such as radio waves or various freely propagating electromagnetic waves, electromagnetic waves propagating through a waveguide, light pulses passing through a fiber optic cable, electrical signals communicated through a wire, and/or various transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

FIG. 1 is a diagram that illustrates a computing environment for completion of data gaps in a dataset, in accordance with an embodiment of the disclosure. With reference to FIG. 1, there is shown a computing environment 100 that contains an example of an environment for the execution of at least some of the computer code involved in performing the disclosed methods, such as a data completion module 120B. In addition to the data completion module 120B, computing environment 100 includes, for example, a computer 102, a wide area network (WAN) 104, an end user device (EUD) 106, a remote server 108, a public cloud 110, and a private cloud 112. In this embodiment of the disclosure, the computer 102 includes a processor set 114 (including a processing circuitry 114A and a cache 114B), a communication fabric 116, a volatile memory 118, a persistent storage 120 (including an operating system 120A and the data completion module 120B, as identified above), a peripheral device set 122 (including a user interface (UI) device set 122A, a storage 122B, and an Internet of Things (IoT) sensor set 122C), and a network module 124. The remote server 108 includes a remote database 108A. The public cloud 110 includes a gateway 110A, a cloud orchestration module 110B, a host physical machine set 110C, a virtual machine set 110D, and a container set 110E.

The computer 102 may take the form of a desktop computer, a laptop computer, a tablet computer, a smartphone, a smartwatch or a wearable computer, a mainframe computer, a quantum computer, or any various forms of a computer or a mobile device now known or to be developed in the future that is capable of running a program, accessing a network or querying a database, such as a remote database 108A. As is well understood in the art of computer technology, and depending upon the technology, the performance of a computer-implemented method may be distributed among multiple computers and/or between multiple locations. In this presentation of the computing environment 100, detailed discussion is focused on a single computer, specifically the computer 102, to keep the presentation as simple as possible. The computer 102 may be located in a cloud, even though it is not shown in a cloud in FIG. 1. The computer 102 is not required to be in a cloud except to any extent as is affirmatively indicated.

The processor set 114 includes one, or more, computer processors of any type now known or to be developed in the future. The processing circuitry 114A may be distributed over multiple packages, for example, multiple, coordinated integrated circuit chips. The processing circuitry 114A may implement multiple processor threads and/or multiple processor cores. The cache 114B is a memory that is located in the processor chip package(s) and is typically used for data or code that should be available for rapid access by the threads or cores running on the processor set 114. Cache memories are typically organized into multiple levels depending upon relative proximity to the processing circuitry 114A. Alternatively, some, or all, of the cache 114B for the processor set 114 may be located "off-chip." In some computing environments, the processor set 114 may be designed for working with qubits and performing quantum computing.

Computer readable program instructions are typically loaded onto the computer 102 to cause a series of operations to be performed by the processor set 114 of the computer 102 and thereby effect a computer-implemented method, such that the instructions thus executed will instantiate the methods specified in flowcharts and/or narrative descriptions of computer-implemented methods included in this document (collectively referred to as "the disclosed methods"). These computer-readable program instructions are stored in various types of computer-readable storage media, such as the cache 114B and the various storage media discussed below. The program instructions, and associated data, are accessed by the processor set 114 to control and direct the performance of the disclosed methods. In computing environment 100, at least some of the instructions for performing the disclosed methods may be stored in the dynamic modification of the data completion module 120B in persistent storage 120.

The communication fabric 116 is the signal conduction path that allows the various components of computer 102 to communicate with each other. Typically, this fabric is made of switches and electrically conductive paths, such as the switches and electrically conductive paths that make up buses, bridges, physical input/output ports, and the like. Various types of signal communication paths are used, such as fiber optic communication paths and/or wireless communication paths.

The volatile memory 118 is any type of volatile memory now known or to be developed in the future. Examples include dynamic type random access memory (RAM) or static type RAM. Typically, the volatile memory 118 is characterized by random access, but this is not required unless affirmatively indicated. In the computer 102, the volatile memory 118 is located in a single package and is internal to computer 102, but alternatively or additionally, the volatile memory 118 may be distributed over multiple packages and/or located externally with respect to computer 102.

The persistent storage 120 is any form of non-volatile storage for computers that is now known or to be developed in the future. The non-volatility of this storage means that the stored data is maintained regardless of whether power is being supplied to computer 102 and/or directly to the persistent storage 120. The persistent storage 120 is a read-only memory (ROM), but typically at least a portion of the persistent storage 120 allows the writing of data, deletion of data, and re-writing of data. Some familiar forms of the persistent storage 120 include magnetic disks and solid-state storage devices. The operating system 120A may take several forms, such as various known proprietary operating systems or open-source Portable Operating System Interface-type operating systems that employ a kernel. The code included in the data completion module 120B typically includes at least some of the computer code involved in performing the disclosed methods.

The peripheral device set 122 includes the set of peripheral devices of computer 102. Data communication connections between the peripheral devices and the various components of computer 102 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments of the disclosure, the UI device set 122A includes components such as a display screen, speaker, microphone, wearable devices (such as goggles and smartwatches), keyboard, mouse, printer, touchpad, game controllers, and haptic devices. The storage 122B is external storage, such as an external hard drive, or insertable storage, such as an SD card. The storage 122B is persistent and/or volatile. In some embodiments of the disclosure, storage 122B may take the form of a quantum computing storage device for storing data in the form of qubits. In embodiments of the disclosure where computer 102 is required to have a large amount of storage (for example, where computer 102 locally stores and manages a large database) then this storage may be provided by peripheral storage devices designed for storing very large amounts of data, such as a storage area network (SAN) that is shared by multiple, geographically distributed computers. The IoT sensor set 122C is made up of sensors that can be used in Internet of Things applications. For example, a first sensor may be a thermometer, and a second sensor may be a motion detector.

The network module 124 is the collection of computer software, hardware, and firmware that allows computer 102 to communicate with various computers through WAN 104. The network module 124 may include hardware, such as modems or Wi-Fi signal transceivers, software for packetizing and/or de-packetizing data for communication network transmission, and/or web browser software for communicating data over the internet. In some embodiments of the disclosure, network control functions, and network forwarding functions of the network module 124 are performed on the same physical hardware device. In various embodiments of the disclosure (for example, embodiments that utilize software-defined networking (SDN)), the control functions and the forwarding functions of the network module 124 are performed on physically separate devices, such that the control functions manage several different network hardware devices. Computer-readable program instructions for performing the disclosed methods can typically be downloaded to computer 102 from an external computer or external storage device through a network adapter card or network interface included in the network module 124.

The WAN 104 is any wide area network (for example, the internet) capable of communicating computer data over non-local distances by any technology for communicating computer data, now known or to be developed in the future. In some embodiments of the disclosure, the WAN 104 may be replaced and/or supplemented by local area networks (LANs) designed to communicate data between devices located in a local area, such as a Wi-Fi network. The WAN 104 and/or LANs typically include computer hardware such as copper transmission cables, optical transmission fibers, wireless transmission, routers, firewalls, switches, gateway computers, and edge servers.

The EUD 106 is any computer system that is used and controlled by an end user (for example, a customer of an enterprise that operates computer 102) and may take any of the forms discussed above in connection with computer 102. The EUD 106 typically receives helpful and useful data from the operations of computer 102. For example, in a hypothetical case where computer 102 is designed to provide a recommendation to an end user, this recommendation would typically be communicated from the network module 124 of computer 102 through WAN 104 to EUD 106. In this way, the EUD 106 can display, or otherwise present recommendations to an end user. In some embodiments of the disclosure, EUD 106 may be a client device, such as a thin client, heavy client, mainframe computer, desktop computer, and so on.

The remote server 108 is any computer system that serves at least some data and/or functionality to the computer 102. The remote server 108 may be controlled and used by the same entity that operates the computer 102. The remote server 108 represents the machine(s) that collect and store helpful and useful data for use by various computers, such as the computer 102. For example, in a hypothetical case where the computer 102 is designed and programmed to provide a recommendation based on historical data, then this historical data may be provided to the computer 102 from the remote database 108A of the remote server 108.

The public cloud 110 is any computer system available for use by multiple entities that provides on-demand availability of computer system resources and/or various computer capabilities, especially data storage (cloud storage) and computing power, without direct active management by the user. Cloud computing typically leverages the sharing of resources to achieve coherence and economies of scale. The direct and active management of the computing resources of the public cloud 110 is performed by the computer hardware and/or software of the cloud orchestration module 110B. The computing resources provided by the public cloud 110 are typically implemented by virtual computing environments that run on various computers making up the computers of the host physical machine set 110C, which is the universe of physical computers in and/or available to the public cloud 110. The virtual computing environments (VCEs) typically take the form of virtual machines from the virtual machine set 110D and/or containers from the container set 110E. It is understood that these VCEs may be stored as images and may be transferred among and between the various physical machine hosts, either as images or after the instantiation of the VCE. The cloud orchestration module 110B manages the transfer and storage of images, deploys new instantiations of VCEs, and manages active instantiations of VCE deployments. The gateway 110A is the collection of computer software, hardware, and firmware that allows public cloud 110 to communicate through WAN 104.

Some further explanation of virtualized computing environments (VCEs) will now be provided. VCEs can be stored as "images". A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

The private cloud 112 is similar to public cloud 110, except that the computing resources are only available for use by a single enterprise. While the private cloud 112 is depicted as being in communication with the WAN 104, in various embodiments of the disclosure, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment of the disclosure, the public cloud 110 and the private cloud 112 are both part of a larger hybrid cloud.

Figure 2:
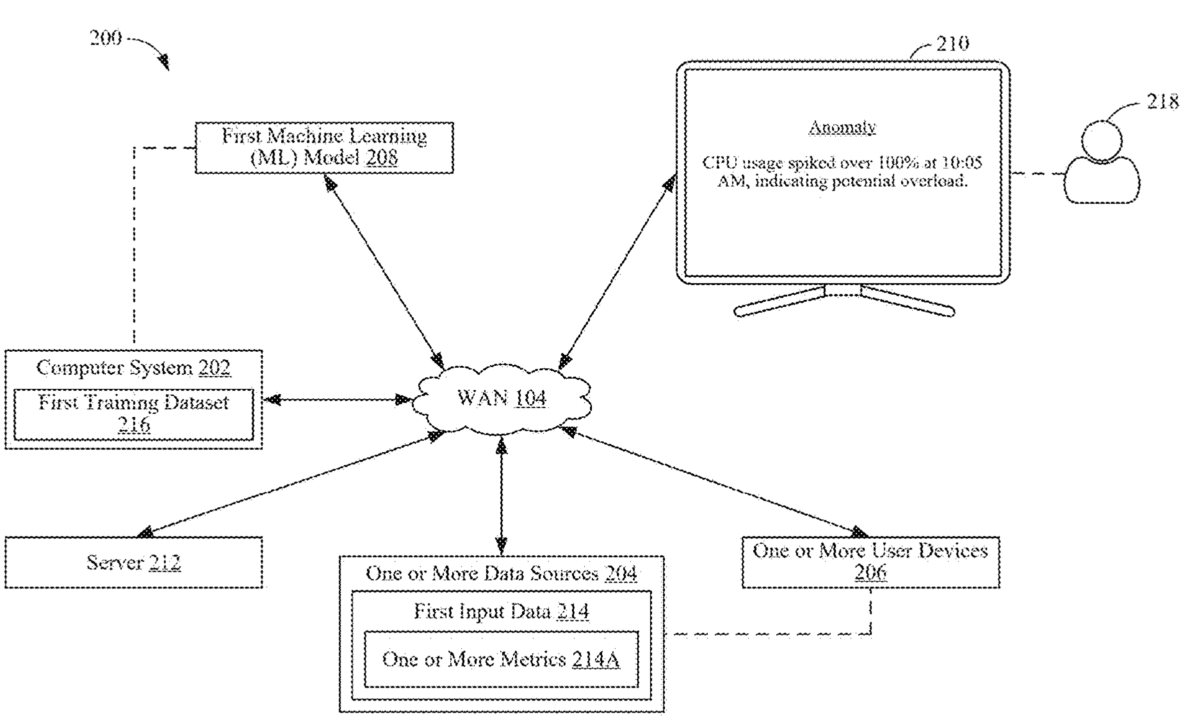
FIG. 2 is a diagram that illustrates an environment for completion of data gaps in a dataset, in accordance with an embodiment of the disclosure.

FIG. 2 is a diagram that illustrates an environment for completion of data gaps in a dataset, in accordance with an embodiment of the disclosure. FIG. 2 is explained in conjunction with elements from FIG. 1. With reference to FIG. 2, there is shown a diagram of a network environment 200. The network environment 200 includes a computer system 202, one or more data sources 204, and one or more user devices 206. The network environment 200 further includes a first machine learning (ML) model 208, a specific user device 210, and a server 212. The one or more data sources 204 include first input data 214 that include one or more metrics 214A associated with the one or more user devices 206. The specific user device 210 is associated with a user 218. The network environment 200 further includes the WAN 104 of FIG. 1. In an embodiment of the disclosure, the specific user device 210 is an exemplary embodiment of the EUD 106. Similarly, the computer system 202 is an exemplary embodiment of the computer 102 in FIG. 1.

The computer system 202 includes suitable logic, circuitry, and/or interfaces for generation of a first training dataset 216 for data completion to enhance anomaly detection. The computer system 202 retrieves the first input data 214 that includes the one or more metrics 214A associated with the one or more user devices 206. The computer system 202 further applies one or more rules on the first input data 214. The computer system 202 further classifies the first input data 214 into a set of groups based on the application of the one or more rules on the first input data 214. The computer system 202 further determines a presence of a first multiplicative relationship between a first metric of the one or more metrics 214A and a second metric of the one or more metrics 214A. The computer system 202 further modifies the second metric based on the determination of the presence of the first multiplicative relationship. The computer system 202 further generates a first portion of the first training dataset 216 based on the modified second metric. The first portion of the first training dataset 216 is exclusive of the first metric. The computer system 202 further trains the first ML model 208 based on the first portion of the first training dataset 216. The first ML model is trained to predict a first value of the first metric. The computer system 202 further outputs the trained first ML model 208.

Examples of the computer system 202 include but are not limited to, a server, a computing device, a virtual computing device, a mainframe machine, a computer workstation, a smartphone, a cellular phone, a mobile phone, a gaming device, or a consumer electronic (CE) device. By way of example, and not by limitation, the computer system 202 may be embodied as a cloud-based service, a cloud-based application, a cloud-based platform, a remote server-based service, a remote server-based application, a remote server-based platform, or a virtual computing system.

Each data source of the one or more data sources 204 corresponds to an organized collection of data that may be stored and accessed electronically from a computer system (such as the computer system 202). Each of the one or more data sources 204 may be designed to manage, store, retrieve, and update data efficiently. In an exemplary implementation, each data source of the one or more data sources 204 may correspond to a database. In such an implementation, the structure of the database corresponding to each data source of the one or more data sources 204 typically involves tables, records, and fields that can be managed through various database management systems (DBMS).

In an embodiment of the disclosure, each data source of the one or more data sources 204 stores the first input data 214. The first input data 214 includes the one or more metrics 214A associated with the one or more user devices 206. Examples of each data source of one or more data sources 204 may include but are not limited to, a relational database, a Non-Structured Query Language (SQL) database, a hierarchical database, a network database, a transactional database, a data warehouse, and a distributed database.

Each user device of the one or more user devices 206 includes suitable logic, circuitry, and/or interfaces that are configured to execute one or more tasks. Each user device of the one or more user devices 206 performs the one or more tasks such as receiving data, processing the data, and transmitting the data. Each user device of the one or more user devices 206. Each user device of the one or more user devices 206 includes a central processing unit (CPU) and a memory unit. Examples of each user device of the one or more user devices 206 include, but are not limited to, a computer workstation, a laptop, a smartphone, a cellular phone, a mobile phone, a consumer electronic (CE) device, an Internet of Things (IoT) device, a computing device, or the like.

The first ML model 208 corresponds to a neural network-based regression model. The neural network is a computational network or a system of artificial neurons, arranged in a plurality of layers, as nodes. The plurality of layers of the neural network may include an input layer, one or more hidden layers, and an output layer. Each layer of the plurality of layers may include one or more nodes (or artificial neurons).

Outputs of all nodes in the input layer may be coupled to at least one node of the hidden layer(s). Similarly, the inputs of each hidden layer are coupled to outputs of at least one node in various layers of the neural network. Outputs of each hidden layer may be coupled to inputs of at least one node in various layers of the neural network. Node(s) in the final layer may receive inputs from at least one hidden layer to output a result.

The number of layers and the number of nodes in each layer may be determined from hyper-parameters of the neural network. Such hyper-parameters may be set before or while training the neural network on the training dataset. Each node of the neural network corresponds to a mathematical function (e.g., a sigmoid 2 function or a rectified linear unit) with a set of parameters, tunable during the training of the neural network. The set of parameters includes, for example, a weight parameter, a regularization parameter, and the like. Each node uses the mathematical function to compute an output based on one or more inputs from nodes in various layer(s) (e.g., previous layer(s)) of the neural network. All or some of the nodes of the neural network correspond to the same or a different mathematical function.

In the training of the first ML model 208, one or more parameters of each node of the first ML model 208 may be updated based on whether an output of the final layer for a given input (from the training dataset) matches a correct result based on a loss function for the first ML model 208. The above process may be repeated for the same or a different input until a minima of loss function may be achieved, and a training error may be minimized. Details related to the training of the first ML model 208 are provided in, for example, FIG. 4A and FIG. 4B and its corresponding description.

The neural network includes electronic data, such as, for example, a software program, code of the software program, libraries, applications, scripts, or various logics or instructions for execution by a processing device, such as circuitry. The neural network may be implemented using hardware including a processor, a microprocessor (e.g., to perform or control the performance of one or more operations), a field-programmable gate array (FPGA), or an application-specific integrated circuit (ASIC). Alternatively, in some embodiments, the neural network may be implemented using a combination of hardware and software. Accordingly, in some embodiments, the first ML model 208 is a separate entity in the computer system 202, without deviation from the scope of the disclosure.

In an embodiment of the disclosure, the computer system 202 trains the first ML model 208 for performing data completion. The computer system 202 adjusts the weights and the regularization parameters of the neural network corresponding to the first ML model 208 based on the training data to train the first ML model 208 for performing data completion. Details about the training of the first ML model 208 are provided, for example, in FIG. 4A and FIG. 4B.

In an embodiment of the disclosure, the computer system 202 stores the first ML model 208. In an alternate embodiment of the disclosure, the first ML model 208 is embodied as a cloud-based service, a cloud-based application, or a cloud-based platform. Examples of the first ML model 208 include one of but are not limited to, an artificial neural network (ANN), a deep neural network (DNN), a convolutional neural network (CNN), a fully connected neural network, and/or a combination of such networks.

The specific user device 210 includes suitable logic, circuitry, and/or interfaces that are configured to execute one or more tasks within the network environment 200. The specific user device 210 performs the one or more tasks such as receiving data, processing the data, and transmitting the data. In an embodiment of the disclosure, the computer system 202 receives second input data from the specific user device 210 for detection of an anomaly associated with the specific user device 210.

In an alternate embodiment of the disclosure, the computer system 202 renders the anomaly on the specific user device 210. The computer system 202 determines the anomaly associated with the specific user device 210 based on an application of a second ML model to the second input data. Details about the second input data, training and application of the second ML model, and the anomaly detection are provided, for example, in FIG. 6, and its corresponding description. Examples of the specific user device 210 include one but are not limited to, a computer workstation, a laptop, a smartphone, a cellular phone, a mobile phone, a consumer electronic (CE) device, an Internet of Things (IoT) device, a computing device, a mainframe machine, a server, or the like. In an embodiment, the specific user device 210 may be an exemplary embodiment of the EUD 106 of FIG. 1.

The server 212 includes suitable logic, circuitry, interfaces, and/or code that stores the first training dataset 216. The server 212 stores the first ML model 208. In an embodiment of the disclosure, the server 212 further stores the first input data 214 that includes the one or more metrics 214A. The server 212 further stores the first multiplicative relationship. The server 212 can be implemented as a cloud server and may execute operations through web applications, cloud applications, HTTP requests, repository operations, file transfer, and the like. Various example implementations of the server 212 include but are not limited to, a database server, a file server, a web server, a media server, an application server, a mainframe server, or a cloud computing server.

In an embodiment of the disclosure, the server 212 is implemented as a plurality of distributed cloud-based resources by use of several technologies that are well known to those ordinarily skilled in the art. A person with ordinary skill in the art will understand that the scope of the disclosure may not be limited to the implementation of the server 212 and the computer system 202 as two separate entities. In certain embodiments, the functionalities of the server 212 can be incorporated in its entirety or at least partially in the computer system 202, without a departure from the scope of the disclosure.

In operation, the computer system 202 retrieves the first input data 214 that includes the one or more metrics 214A. The one or more metrics 214A are associated with the one or more user devices 206. The first input data 214 refers to raw data that includes performance metrics of each user device of the one or more user devices 206 collected over time, characterized by time-stamped entries of the performance metrics that allow for analysis of trends, patterns, and anomalies. The performance metrics are quantitative measurements that provide insights into various aspects of performance, resource utilization, and security of the one or more user devices 206. In an embodiment of the disclosure, the computer system 202 retrieves the first input data 214 from the one or more data sources 204.

For example, the one or more metrics 214A include a first metric associated with a utilization of a first resource (say CPU) of each user device of the one or more user devices 206. The first metric is a measure of the percentage of time the central processing unit (CPU) is actively performing tasks within a given time frame. The one or more metrics 214A further includes a second metric associated with the utilization of a second resource (say memory) of each user device of the one or more user devices 206. The second metric measures the proportion of the memory (or the RAM) that is currently being used to store data and run applications. The one or more metrics 214A may further include disk I/O operations, event logs, network traffic, application response times, and the like, all of which provide insights into the performance and health of each user device of the one or more user devices 206. The disk I/O operations is a metric that quantifies the number of read and write operations performed on a disc.

By way of example, and not by limitation, the computer system 202 retrieves a first metric associated with CPU utilization, a second metric associated with memory utilization, a third metric associated with disc read operations, and a fourth metric of disc write operations. The first input data 214 can be represented in the Table 1 below:

TABLE 1

| First Input Data | | | | |
|---|---|---|---|---|
| Timestamp | CPU utilization | Memory Utilization | Disc Read operations | Disc Write operations |
| 10:00 AM | 25% | 4 GB of 16 GB | 200 | 100 |
| 10:01 AM | 40% | 6 GB of 16 GB | 300 | 150 |
| 10:02 AM | 50% | 8 GB of 16 GB | 400 | 200 |
| 10:03 AM | 65% | 10 GB of 16 GB | 500 | 250 |
| 10:04 AM | 75% | 12 GB of 16 GB | 600 | 300 |
| 10:05 AM | 100% | 16 GB of 16 GB | 10000 | 10000 |

Thereafter, the computer system 202 applies the one or more rules to the first input data 214. The computer system 202 applies the one or more rules to identify and group similar metrics from the one or more metrics 214A in the first input data 214. In an embodiment of the disclosure, the computer system 202 applies a detection rule of the one or more rules to identify and group similar metrics from the one or more metrics 214A. Specifically, the computer system 202 determines whether each metric of the one or more metrics 214A is associated with one of a core-based metric or a non-core-based metric and then groups the similar metrics based on the determination. The core-based metrics are the metrics that directly measure the performance and utilization of fundamental resources of the user device. Examples of such fundamental resources include CPU and memory. The non-core-based metrics are the metrics that determine the performance and health of systems through indirect indicators. The core-based metrics include the metrics such as CPU utilization and memory utilization and the non-core-based metrics include the metrics such as disk I/O operations, event logs, network traffic, and application response times. Details about the determination of the core-based metric and the non-core-based metric are provided, for example, in FIG. 3A and its corresponding description.

Further, the computer system 202 classifies the first input data 214 into the set of groups based on the application of the one or more rules to the first input data 214. In an embodiment of the disclosure, the computer system 202 classifies each metric of the one or more metrics 214A into a corresponding group of the set of groups based on the application of the one or more rules. The set of groups includes a first group associated with CPU utilization, a second group associated with memory utilization, a third group associated with disc read operations, a fourth group associated with disc write operations, and the like. In an embodiment of the disclosure, the computer system 202 further generates grouped data based on the classification of the first input data 214 into the set of groups. The grouped data include each metric of the one or more metrics 214A classified into the corresponding group of the set of groups.

By way of example, and not by limitation, the computer system 202 classifies the first metric (the CPU utilization) into a first group. The computer system 202 further classifies the second metric (the memory utilization) into a second group. The computer system 202 further classifies the third metric (the disc-read operations) into a third group and the fourth metric (disc-write operations) into a fourth group.

Thereafter, the computer system 202 determines one of the presence or an absence of the first multiplicative relationship between the first metric of the one or more metrics 214A and the second metric of the one or more metrics 214A. The multiplicative relationship between two or more metrics exists when one metric can be expressed as a product of one or more metrics multiplied by a constant value. Mathematically, the multiplicative relationship can be expressed in the equation (1) below:

$$\alpha = k * b * c \quad (1)$$

where, a: the metric that is expressed as a product of two metrics b and c k: constant value Specifically, the computer system 202 applies a third ML model (different from the first ML model 208) to determine one of the presence or the absence of the first multiplicative relationship between the one or more metrics 214A. The third ML model corresponds to a multiplicative model that identifies the multiplicative relationships between the one or more metrics. The third ML model utilizes all permutations of the one or more metrics 214A to determine whether there is any multiplicative relationship that exists between the one or more metrics 214A.

By way of example, and not by limitation, the computer system 202 determines the presence of the first multiplicative relationship between the first metric associated with the CPU utilization of the first user device and the second metric associated with the memory utilization of the first user device. The computer system 202 determines that the increase in the CPU utilization metric (the first metric) corresponds to the increase in the memory utilization metric (the second metric). The increased CPU utilization correlates with increased memory utilization. Further, the computer system 202 determines that when the CPU utilization metric is increased from 25% at 10:00 AM to 50% at 10:02 AM (twice), the memory utilization metric also increased from 4 GB at 10:00 AM to 8 GB at 10:02 AM (twice). Therefore, the computer system 202 determines the first multiplicative relationship between the first metric and the second metric that first metric is directly proportional to the second metric. This indicates the constant value 'k' is 1 in this case. The computer system 202 further determines that the memory utilization at the initial timestamp (10:00 AM) was 4 GB of 16 GB, which is equal to 25%, and the CPU utilization of the first user device at 10:00 AM was 25%, which also proves the directly proportional relationship. Further, the computer system 202 determines that when the memory utilization peaked at 100% (at 10:05 AM, 16 GB of 16 GB), the CPU utilization also peaked at 100%, indicating a potential anomaly based on the first multiplicative relationship.

Further, the computer system 202 modifies the second metric based on the determination of the presence of the first multiplicative relationship. In an embodiment of the disclosure, the computer system 202 modifies the second metric in the grouped data based on the first multiplicative relationship. By way of example, and not by limitation, the modified second metric (memory utilization) can be represented in Table 2 as given below:

TABLE 2

| Modified Second Metric (Based on First Multiplicative relationship) | | |
|---|---|---|
| Timestamp | Second Metric | Modified Second Metric |
| 10:00 AM | 4 GB of 16 GB | 4 GB of 16 GB |
| 10:02 AM | 8 GB of 16 GB | (2*4) GB of 16 GB |
| 10:04 AM | 12 GB of 16 GB | (3*4) GB of 16 GB |
| 10:05 AM | 16 GB of 16 GB | 16 GB of 16 GB |

Thereafter, the computer system 202 generates the first portion of the first training dataset 216 based on the modified second metric. The first portion of the first training dataset 216 is exclusive of the first metric. The computer system 202 modifies the grouped data to generate the first portion of the first training dataset 216 for training the first ML model 208. In an embodiment of the disclosure, the computer system 202 excludes the first metric from the grouped data and modifies the second metric based on the first multiplicative relationship to generate the first portion of the first training dataset 216. Similarly, the computer system 202 generates the first portion of the first training dataset 216 based on the modification of the one or more metrics 214A according to the first multiplicative relationship.

By way of example, and not by limitation, the first portion of the first training dataset 216 can be represented in Table 3 as shown below:

TABLE 3

| First Portion of First Training Dataset | | | |
|---|---|---|---|
| Timestamp | Memory Utilization | Disc read operations | Disc write operations |
| 10:00 AM | 4 GB of 16 GB | 200 | 100 |
| 10:02 AM | (2*4) GB of 16 GB | 2*200 | 2*100 |
| 10:04 AM | (3*4) GB of 16 GB | 3*200 | 3*100 |
| 10:05 AM | 16 GB of 16 GB | 100000 | 100000 |

Thereafter, the computer system 202 trains the first ML model 208 based on the first portion of the first training dataset 216. The first ML model 208 is trained to predict the first value of the first metric based on the first portion of the first training dataset 216. In an embodiment of the disclosure, the computer system 202 trains the first ML model 208 to predict the first value of the first metric based on the one or more metrics 214A in the first portion of the first training dataset 216.

In the training of the first ML model 208, the computer system 202 provides the first ML model 208 with the first portion of the first training dataset 216. The first metric is excluded from the first portion of the first training dataset 216. The first ML model 208 analyzes the modified second metric and the one or more metrics 214A to determine an ML algorithm for the prediction of the first metric based on the one or more metrics 214A in the first portion.

The computer system 202 further adjusts the weights and the regularization parameters of the neural network corresponding to the first ML model 208 based on a determination that the predicted first value of the first metric is different from a second value (actual value) of the first metric. The computer system 202 repeats the adjustment of the weights and the regularization parameters until the minima of the loss function is achieved or the training error is minimized as discussed above. Details about the training of the first ML model 208 are further provided, for example, in FIG. 4A and FIG. 4B.

To this end, the computer system 202 outputs the first ML model 208. In an embodiment of the disclosure, the computer system 202 deploys the trained first ML model 208 for the task of data completion. In an alternate embodiment of the disclosure, the computer system 202 stores the trained first ML model 208 into the server 212 for performing the task of data completion to enhance anomaly detection.

Figure 3A:
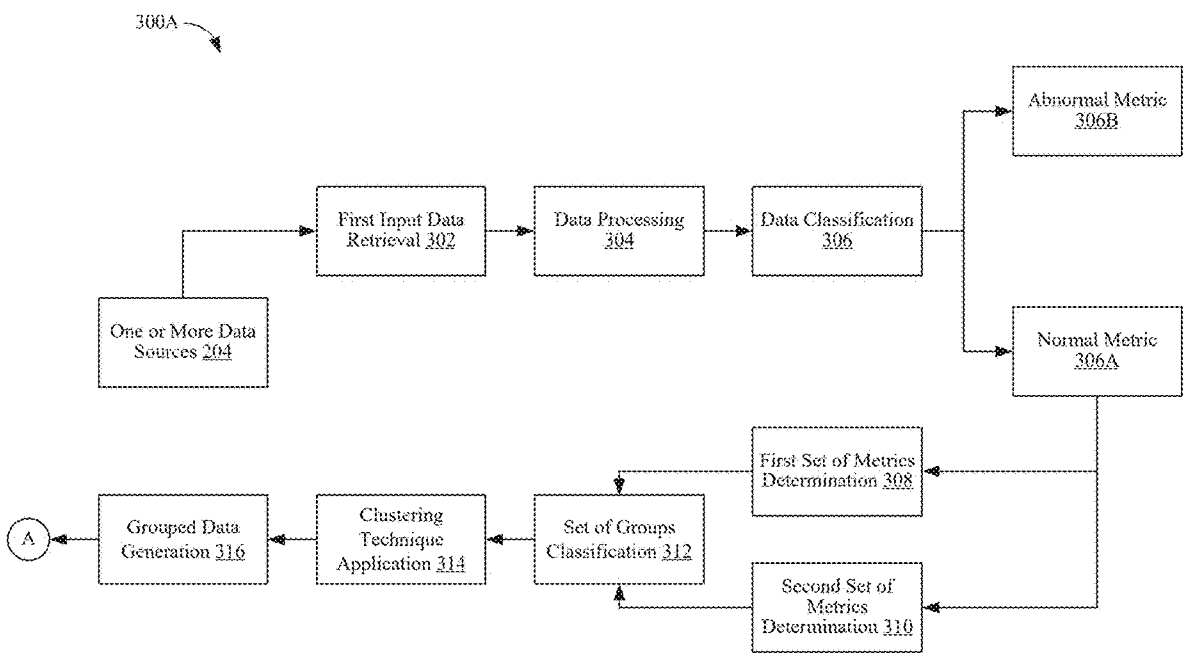
FIG. 3A is a diagram that illustrates exemplary operations for generation of grouped data for completion of data gaps in a dataset, in accordance with an embodiment of the disclosure.

FIG. 3A is a diagram that illustrates exemplary operations for generation of grouped data for completion of data gaps in a dataset, in accordance with an embodiment of the disclosure. FIG. 3A is explained in conjunction with elements from FIG. 1 and FIG. 2. With reference to FIG. 3A, there is shown the block diagram 300A that illustrates exemplary operations from 302 to 316, as described herein. The exemplary operations illustrated in the block diagram 300A start at 302 and are performed by any computing system, apparatus, or device, such as by the computer 102 of FIG. 1 or by the computer system 202 of FIG. 2. Although illustrated with discrete blocks, the exemplary operations associated with one or more blocks of the block diagram 300A can be divided into additional blocks, combined into fewer blocks, or eliminated, depending on the implementation.

At 302, a first input data retrieval operation is performed. In the first input data retrieval operation, the computer system 202 retrieves the first input data 214 associated with the one or more metrics 214A. The one or more metrics 214A are associated with the one or more user devices 206. The first input data 214 refers to raw data that includes performance metrics of each user device of the one or more user devices 206 collected over time, characterized by time-stamped entries of the performance metrics that allow for analysis of trends, patterns, and anomalies. The performance metrics are quantitative measurements that provide insights into various aspects of performance, resource utilization, and security of the one or more user devices 206. In an embodiment of the disclosure, the computer system 202 retrieves the first input data 214 from the one or more data sources 204.

In an embodiment of the disclosure, the one or more metrics 214A include a first metric associated with a utilization of a first resource (say CPU) of each user device of the one or more user devices 206. The first metric is a measure of the percentage of time the central processing unit (CPU) is actively performing tasks within a given time frame. The one or more metrics 214A further includes a second metric associated with the utilization of a second resource (say memory) of each user device of the one or more user devices 206. The second metric measures the proportion of the memory (or the RAM) that is currently being used to store data and run applications. The one or more metrics 214A may further include disk I/O operations, event logs, network traffic, application response times, and the like, all of which provide insights into the performance and health of each user device of the one or more user devices 206. The disk I/O operations is a metric that quantifies the number of read and write operations performed on a disc.

By way of example, and not by limitation, the computer system 202 retrieves a first metric associated with CPU utilization, a second metric associated with memory utilization, a third metric associated with Disc Read operations, and a fourth metric associated with disc write operations. The first input data 214 can be represented in the Table 4 below:

TABLE 4

| First Input Data | | | | |
|---|---|---|---|---|
| Timestamp | CPU utilization | Memory Utilization | Disc Read operations | Disc Write operations |
| 10:00 AM | 25.2% | 4 GB of 16 GB | 200 | 100 |
| 10:02 AM | 50.1% | 8 GB of 16 GB | 400 | 200 |
| 10:05 AM | 100% | 16 GB of 16 GB | 10000 | 10000 |
| 10:06 AM | 400% | 22 GB of 16 GB | 10000 | 10000 |
| 10:01 AM | 40% | 6 GB of 16 GB | 300 | 150 |
| 10:03 AM | 65.3% | 10 GB of 16 GB | 500 | 250 |
| 10:04 AM | 75% | 12 GB of 16 GB | 600 | 300 |

At 304, a data processing operation is performed. In the data processing operation, the computer system 202 applies one or more data processing operations to the first input data 214. In an embodiment of the disclosure, the one or more data processing operations include a data normalization operation and a data serialization operation. In the data normalization operation, the computer system 202 normalizes the first input data 214. Specifically, the computer system 202 normalizes the one or more metrics 214A associated with the first input data 214. The computer system 202 normalizes the one or more metrics 214A by converting the decimal value metrics (say 25.2) into numerical value metrics (say 25).

By way of example, and not by limitation, the computer system 202 converts the decimal value metrics (25.2) into numerical value metrics (25) by rounding off to the nearest decimal places. The computer system 202 normalizes the first input data to obtain normalized first input data as shown in Table 5 below:

TABLE 5

| Normalized First Input Data | | | | |
|---|---|---|---|---|
| Timestamp | CPU utilization | Memory Utilization | Disc Read operations | Disc Write operations |
| 10:00 AM | 25% | 4 GB of 16 GB | 200 | 100 |
| 10:02 AM | 50% | 8 GB of 16 GB | 400 | 200 |
| 10:05 AM | 100% | 16 GB of 16 GB | 10000 | 10000 |
| 10:06 AM | 400% | 22 GB of 16 GB | 10000 | 10000 |
| 10:01 AM | 40% | 6 GB of 16 GB | 300 | 150 |
| 10:03 AM | 65% | 10 GB of 16 GB | 500 | 250 |
| 10:04 AM | 75% | 12 GB of 16 GB | 600 | 300 |

In an embodiment of the disclosure, the computer system 202 further applies the data serialization operation to serialize (or arrange) the first input data 214 into one or more vectors. The computer system 202 generates the one or more vectors to store the serialized (or arranged) one or more metrics. Each vector of the one or more vectors includes the serialized one or more metrics 214A associated with the first input data 214. The computer system 202 serializes (or arranges) the one or more metrics 214A associated with the first input data 214 based on a parameter (for example the timestamp). In an embodiment of the disclosure, the computer system 202 serializes (or arranges) each metric of the one or more metrics 214A according to the timestamp associated with a corresponding metric of the one or more metrics 214A. Details about the data normalization and the data serialization are known in the art and have been omitted for the sake of brevity. The serialized one or more metrics 214A can be represented in the equation (2) below:

$$(a, \ldots, n) \quad (2)$$

where, a: first metric n: Nth metric

By way of example, and not by limitation, the computer system 202 converts the decimal value metrics (25.2) into numerical value metrics (25) by rounding off to the nearest decimal places. The computer system 202 normalizes the first input data to obtain normalized first input data as shown in Table 6 below:

TABLE 6

| Serialized First Input Data | | | | |
|---|---|---|---|---|
| Timestamp | CPU utilization | Memory Utilization | Disc Read operations | Disc Write operations |
| 10:00 AM | 25% | 4 GB of 16 GB | 200 | 100 |
| 10:01 AM | 40% | 6 GB of 16 GB | 300 | 150 |
| 10:02 AM | 50% | 8 GB of 16 GB | 400 | 200 |
| 10:03 AM | 65% | 10 GB of 16 GB | 500 | 250 |
| 10:04 AM | 75% | 12 GB of 16 GB | 600 | 300 |
| 10:05 AM | 100% | 16 GB of 16 GB | 10000 | 10000 |
| 10:06 AM | 400% | 22 GB of 16 GB | 10000 | 10000 |

At 306, a data classification operation is performed. In the data classification operation, the computer system 202 classifies each metric of the one or more metrics 214A into one of a normal metric 306A or an abnormal metric 306B based on the application of the one or more data processing operations. In an embodiment of the disclosure, the computer system 202 classifies each metric of the one or more metrics 214A into one of the normal metric 306A or the abnormal metric 306B using one or more error repositories. The computer system 202 retrieves the one or more error repositories from the one or more data sources 204 and then classifies each metric of the one or more metrics 214A based on the one or more error repositories. The one or more error repositories include one or more rules for identifying the abnormal metric 306B from the one or more metrics 214A.

The normal metric 306A is the metric that is consistent and the value of the normal metric 306A falls within expected ranges as defined in the one or more error repositories. The normal metric 306A can be used for accurately training the first ML model 208 (data completion model) as its value falls within the expected ranges. By way of example, and not by limitation, the normal metric 306A for CPU utilization can be one of (10%, 20%, 25%, 40%, 50%, 50%, 70%) and for memory utilization can be one of (2 GB of 16 GB, 3 GB of 16 GB, 4 GB of 16 GB, 5 GB of 16 GB).

The abnormal metric 306B is the metric that is inconsistent, and divergent and the value of the abnormal metric 306B falls outside the expected ranges as defined in the one or more error repositories. The training of the first ML model 208 (the data completion model) based on the abnormal metric 306B can lead to inaccurate results, and hence they are filtered out before generating the grouped data. By way of example, and not by limitation, the abnormal metrics 306B for CPU utilization can be (200%, 300%, 400%) and for memory utilization can be (20 GB of 16 GB, 22 GB of 16 GB, 24 GB of 16 GB).

By way of example, and not by limitation, the computer system classifies each metric of the one or more metrics 214A into one of the normal metric 306A or the abnormal metric 306B. The normal metrics can be represented in the equation (3) below:

$$(a', \ldots, n') \quad (3)$$

where, a': first normal metric n': Nth normal metric

The normal metric 306A that will be used for further generating the first training dataset 216 is represented in Table 7 below:

TABLE 7

| Normal Metrics | | | | |
|---|---|---|---|---|
| Timestamp | CPU utilization | Memory Utilization | Disc Read operations | Disc Write operations |
| 10:00 AM | 25% | 4 GB of 16 GB | 200 | 100 |
| 10:01 AM | 40% | 6 GB of 16 GB | 300 | 150 |
| 10:02 AM | 50% | 8 GB of 16 GB | 400 | 200 |
| 10:03 AM | 65% | 10 GB of 16 GB | 500 | 250 |
| 10:04 AM | 75% | 12 GB of 16 GB | 600 | 300 |
| 10:05 AM | 100% | 16 GB of 16 GB | 10000 | 10000 |

At 308, a first set of metrics determination operation is performed. In the first set of metrics determination operation, the computer system 202 determines that the one or more metrics 214A are associated with a first set of metrics based on the normal metric 306A. Specifically, the first set of metrics may correspond to a set of core-based metrics. The set of core-based metrics corresponds to the metrics that directly measure the performance and utilization of fundamental system resources, such as CPU and memory.

The set of core-based metrics includes the one or metrics 214A that are associated with the CPU utilization and the one or more metrics 214A that are associated with the memory utilization. The computer system 202 identifies the one or more metrics 214A from the normal metric 306A that are associated with the set of core-based metrics. By way of example, and not by limitation, the computer system 202 determines that the first metric (CPU utilization) and the second metric (memory utilization) are associated with the first set of metrics (the set of core-based metrics).

At 310, a second set of metrics determination operation is performed. In the second set of metrics determination operation, the computer system 202 determines that the one or more metrics 214A are associated with a second set of metrics based on the normal metric 306A. Specifically, the second set of metrics corresponds to a set of non-core-based metrics. The set of non-core-based metrics corresponds to the metrics that determine the performance and health of systems through indirect indicators The set of non-core-based metrics includes the one or metrics 214A that are associated with the disk I/O operations, the event logs, the network traffic, and the application response times. By way of example, and not by limitation, the third metric (disc read operations) and the fourth metric (disc write operations) are associated with the set of non-core metrics.

In an embodiment of the disclosure, the computer system 202 further determines a set of features associated with the one or more metrics 214A based on the determination that the one or more metrics 214A are associated with the second set of metrics (the set of non-core-based metrics). The set of features includes a transaction rate of each metric of the one or more metrics 214A and a type of each metric of the one or more metrics 214A. The transaction rate indicates the processing rate of each operation indicated by a corresponding metric of the one or more metrics 214A. The type may indicate whether the operation indicated by the corresponding metric is a read operation, write operation, hybrid operation (read-write both together), or the like.

By way of example, and not by limitation, the computer system 202 determines the transaction rate and the type of the third metric (disc read operation) and the fourth metric (disc write operation). The transaction rate of the third metric (disc read operations) is "100 reads per minute" and the type is "read operation". The transaction rate of the fourth metric (disc write operations) is "50 reads per minute" and the type is "write operation".

At 312, a set of groups classification operation is performed. In the set of groups classification operation, the computer system 202 classifies the first input data 214 into the set of groups based on the normal metric 306A. Since the abnormal metric 306B is unfit for training the first ML model 208, the computer system 202 classifies only the normal metrics into the set of groups in order to ensure that the performance (accuracy) of the trained first ML model 208 is greater than a performance threshold.

In an embodiment of the disclosure, the computer system 202 classifies the first input data 214 into the set of groups based on the determination that the one or more metrics 214A are associated with the first set of metrics (the set of core-based metrics). Specifically, the computer system 202 classifies the one or more metrics 214A into the set of groups based on the set of core-based metrics. By way of example, the computer system 202 classifies the first metric (the CPU utilization) into a first group of CPU utilization metrics and the second metric (the memory utilization) into a second group of memory utilization metrics.

In an embodiment of the disclosure, the computer system 202 classifies the first input data 214 into the set of groups based on the set of features associated with each metric of the one or more metrics 214A. In an embodiment of the disclosure, the computer system 202 classifies the one or more metrics 214A based on the type (or transaction rate) of each metric of the one or more metrics 214A. By way of example, the computer system 202 classifies the third metric into a third group of disc-read operations and the fourth metric into a fourth group of disc-write operations. Each group can be represented in the equation (4) below:

$$G_i = (a_i', \ldots , n_i') \quad (4)$$

where, $G_i$: corresponding group

At 314, a clustering technique application operation is performed. In the clustering technique application operation, the computer system 202 applies a clustering technique to the one or more metrics 214A to generate a set of clusters associated with the set of groups. In an embodiment of the disclosure, the computer system 202 applies the clustering technique to generate a set of clusters associated with each group of the set of groups. Clustering is the process of grouping a set of data points into clusters based on their similarities. By way of example, and not by limitation, the computer system 202 generates a first cluster of the first group (the CPU utilization), a second cluster of the second group (the memory utilization), and the like.

By way of example, and not by limitation, the computer system 202 applies one of a K-means clustering technique, a hierarchical clustering technique, or a mean score clustering technique to generate the set of clusters. Details about the K-means clustering technique, the hierarchical clustering technique, and the mean score clustering technique are known in the art and have been omitted for the sake of brevity.

At 316, a grouped data generation operation is performed. In the grouped data generation operation, the computer system 202 generates the grouped data based on the set of groups and the set of clusters associated with the first input data. The grouped data includes each group of the set of groups. By way of example, and not by limitation, the grouped data includes the first group of first metric (the CPU utilization), the second group of the second metric (the memory utilization), the third group of the third metric (disc read operations) and the fourth group of the fourth metric (the disc write operations). The grouped data can be represented in the equation (5) below:

$$G = (G_1, \ldots , G_m) \quad (5)$$

where,

G: grouped data $G_i=(a_i', \ldots, n_i')$ as described in the equation (4) above.

Figure 3B:
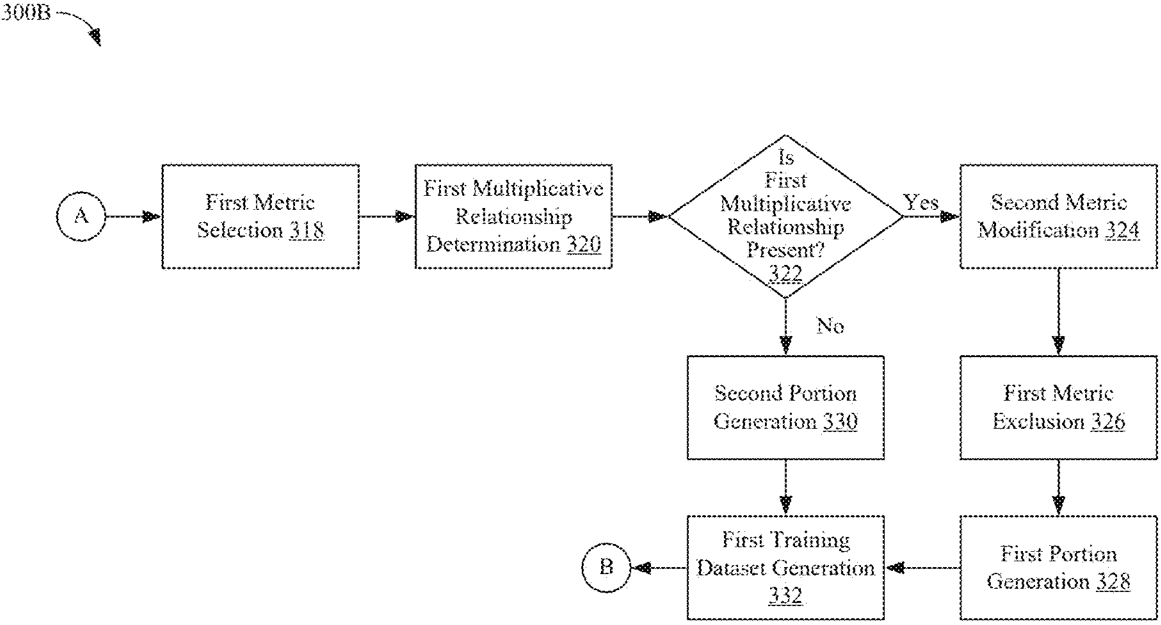
FIG. 3B is a diagram that illustrates exemplary operations for generation of a training dataset completion of data gaps in a dataset, in accordance with an embodiment of the disclosure.

FIG. 3B is a diagram that illustrates exemplary operations for generation of a training dataset for completion of data gaps in a dataset, in accordance with an embodiment of the disclosure. FIG. 3B is explained in conjunction with elements from FIG. 1, FIG. 2, and FIG. 3A. With reference to FIG. 3B, there is shown the block diagram 300B that illustrates exemplary operations from 318 to 332, as described herein. The exemplary operations illustrated in the block diagram 300B start at 318 and are performed by any computing system, apparatus, or device, such as by the computer 102 of FIG. 1 or by the computer system 202 of FIG. 2. Although illustrated with discrete blocks, the exemplary operations associated with one or more blocks of the block diagram 300B can be divided into additional blocks, combined into fewer blocks, or eliminated, depending on the implementation.

At 318, a first metric selection operation is performed. In the first metric selection operation, the computer system 202 selects the first metric from the one or more metrics 214A. The computer system 202 selects the first metric from the grouped data. In an embodiment, the computer system 202 randomly selects the first metric from $G_i=(a_i', \ldots, n_i')$. For example, the computer system 202 selects the first metric $a_i'$ from the grouped data.

By way of example, and not a limitation, the computer system 202 selects the first metric associated with the CPU utilization (10:00 AM: 25%, 10:01 AM: 40%, 10:02 AM: 50%, 10:03 AM: 65%, 10:04 AM: 75%, 10:05 AM: 100%).

At 320, a first multiplicative relationship determination operation is performed. In the first multiplicative relationship identification operation, the computer system 202 determines one of the presence or the absence of the first multiplicative relationship between the first metric and the second metric. As discussed above, the multiplicative relationship between two or more metrics is present when one metric can be expressed as a product of the one or more metrics 214A. The computer system 202 determines the first multiplicative relationship between the first metric and the second metric based on the equation (1) as described above.

In an embodiment, the computer system 202 applies the third ML model (different from the first ML model 208) to each group of the set of groups. The computer system 202 further identifies the first multiplicative relationship between the one or more metrics 214A based on the application of the third ML model to each group of the set of groups. The third ML model corresponds to a multiplicative model that identifies the multiplicative relationships between the one or more metrics 214A. The third ML model utilizes all permutations of the one or more metrics 214A to determine whether there is any multiplicative relationship that exists between the one or more metrics 214A. The third ML model utilizes all permutations of the one or more metrics 214A to determine whether there is any multiplicative relationship that exists between the one or more metrics 214A.

By way of example, and not by limitation, the computer system 202 determines the presence of the first multiplicative relationship between the first metric associated with the CPU utilization of the first user device and the second metric associated with the memory utilization of the first user device. The computer system 202 determines that the increase in the CPU utilization metric (the first metric) corresponds to the increase in the memory utilization metric (the second metric). The increased CPU utilization correlates with increased memory utilization. Further, the computer system 202 determines that when the CPU utilization metric is increased from 25% at 10:00 AM to 50% at 10:02 AM (twice), the memory utilization metric also increased from 4 GB at 10:00 AM to 8 GB at 10:02 AM (twice). Therefore, the computer system 202 determines the first multiplicative relationship between the first metric and the second metric that the first metric is directly proportional to the second metric. (k=1 in the formula of equation 1). The computer system 202 further determines that the memory utilization at the initial timestamp (10:00 AM) was 4 GB of 16 GB, which is equal to 25%, and the CPU utilization of the first user device at 10:00 AM was 25%, which also proves the directly proportional relationship. Further, the computer system 202 determines that when the memory utilization peaked over 100% (at 10:05 AM, 20 GB of 16 GB), the CPU utilization also peaked at 100%, indicating a potential anomaly based on the first multiplicative relationship.

At 322, it is determined that the first multiplicative relationship is present. In an embodiment of the disclosure, the computer system 202 determines the presence of the first multiplicative relationship between the first metric and the second metric. In an alternate embodiment of the disclosure, the computer system 202 determines the absence of the first multiplicative relationship. Based on the determination that the first multiplicative relationship is present, the control of operations moves to 324, otherwise, the control of operations moves to 330. The control of operations moves to 324 at which the second metric is expressed in terms of the first metric based on the first multiplicative relationship. The modification of the second metric reduces the time of the first ML model 208 for the identification of the patterns and the relationships that in turn reduces the overall time for training of the first ML model 208 and increases the performance (accuracy) of the first ML model 208 for performing data completion.

At 324, a second metric modification operation is performed. In the second metric modification operation, the computer system 202 modifies the second metric in the grouped data based on the determination of the presence of the first multiplicative relationship. The computer system 202 transforms the second metric in the grouped data based on the identified first multiplicative relationship.

By way of example, and not by limitation, the modified second metric (memory utilization) can be represented in Table 8 as given below:

TABLE 8

| Modified Second Metric (Based on First Multiplicative relationship) | | |
|---|---|---|
| Timestamp | Second Metric | Modified Second Metric |
| 10:00 AM | 4 GB of 16 GB | 4 GB of 16 GB |
| 10:02 AM | 8 GB of 16 GB | (2*4) GB of 16 GB |
| 10:04 AM | 12 GB of 16 GB | (3*4) GB of 16 GB |
| 10:05 AM | 16 GB of 16 GB | 16 GB of 16 GB |

At 326, a first metric exclusion operation is performed. In the first metric exclusion operation, the computer system 202 excludes the first metric from the modified grouped data (that includes the modified second metric) for the generation of the first portion of the first training dataset 216. By way of example, and not by limitation, the computer system 202 excludes the first metric associated with the CPU utilization for the generation of the first portion of the first training dataset 216.

At 328, a first portion generation operation is performed. In the first portion generation operation, the computer system 202 generates the first portion of the first training dataset 216 for training the first ML model 208. In an embodiment of the disclosure, the computer system 202 generates the first portion of the first training dataset 216 based on the modified second metric upon the determination of the presence of the first multiplicative relationship. The first metric is excluded from the first portion of the first training dataset 216 and the second metric is modified in the first portion of the first training dataset 216 based on the first multiplicative relationship.

By way of example, and not by limitation, the computer system 202 generates the first portion of the first training dataset 216. The first portion of the first training dataset 216 can be represented in Table 8 as provided below:

TABLE 8

| First Portion of the First Training Dataset | | | |
|---|---|---|---|
| Timestamp | Memory Utilization | Disc read operations | Disc write operations |
| 10:00 AM | 4 GB of 16 GB | 200 | 100 |
| 10:02 AM | 2*4 GB of 16 GB | 2*200 | 2*100 |
| 10:04 AM | 3*4 GB of 16 GB | 3*200 | 3*100 |
| 10:05 AM | 16 GB of 16 GB | 100000 | 100000 |

At 330, a second portion generation operation is performed. In the second portion generation operation, the computer system 202 generates a second portion of the first training dataset 216 based on the determination of the absence of the first multiplicative relationship. The second portion of the first training dataset 216 is inclusive of the first metric. The first metric is included in the second portion of the first training dataset 216. In an embodiment of the disclosure, the computer system 202 generates the second portion for the training of the first ML model 208. By way of example, the second portion of the first training dataset 216 can be represented in Table 9 below:

TABLE 9

| Second Portion of First Training Dataset | | | | |
|---|---|---|---|---|
| Timestamp | CPU Utilization | Memory Utilization | Disc read operations | Disc write operations |
| 10:00 AM | 25% | 4 GB of 16 GB | 200 | 100 |
| 10:01 AM | 40% | 6 GB of 16 GB | 300 | 150 |
| 10:03 AM | 65% | 10 GB of 16 GB | 500 | 250 |
| 10:05 AM | 100% | 16 GB of 16 GB | 100000 | 100000 |

At 332, a first training dataset generation operation is performed. In the first training dataset generation operation, the computer system 202 generates the first training dataset 216 based on the first portion and the second portion. In an embodiment of the disclosure, the computer system 202 combines the first portion and the second portion to generate the first training dataset 216. In an embodiment of the disclosure, the computer system 202 generates the first training dataset 216 for the training of the first ML model 208. By way of example, and not by limitation, the first training dataset 216 is represented in Table 10 below:

TABLE 10

| First Training Dataset | | | | |
|---|---|---|---|---|
| Timestamp | CPU Utilization | Memory Utilization | Disc read operations | Disc write operations |
| 10:00 AM | 25% | 4 GB of 16 GB | 200 | 100 |
| 10:01 AM | 40% | 6 GB of 16 GB | 300 | 150 |
| 10:02 AM | 50% | 2*4 GB of 16 GB | 2*200 | 2*100 |
| 10:03 AM | 65% | 10 GB of 16 GB | 500 | 250 |
| 10:04 AM | 75% | 3*4 GB of 16 GB | 3*200 | 3*100 |
| 10:05 AM | 100% | 16 GB of 16 GB | 100000 | 100000 |

Figure 4A:
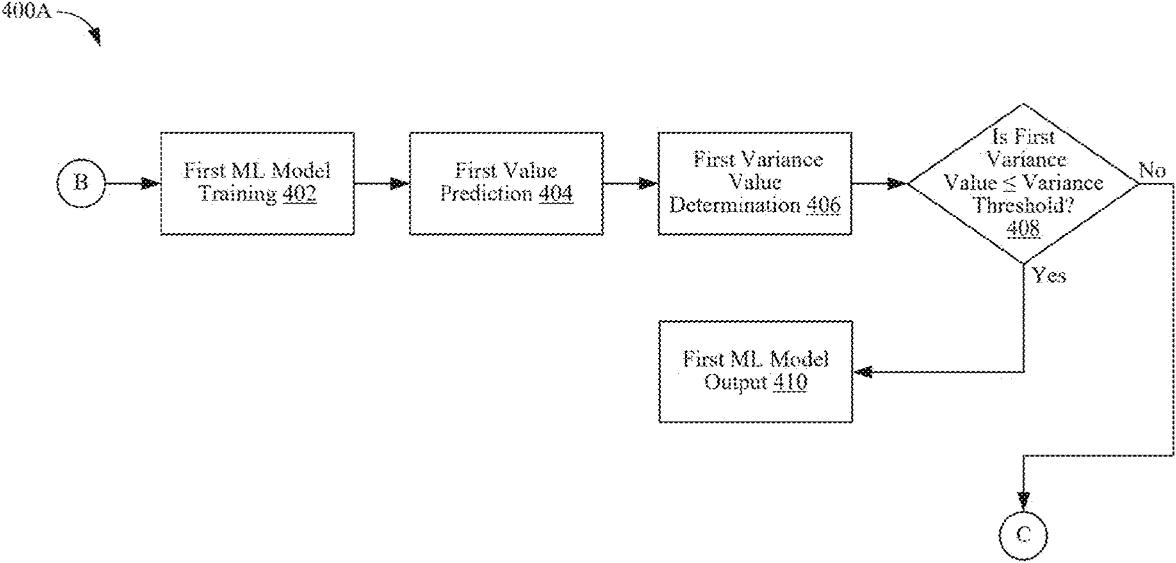
FIG. 4A is a diagram that illustrates first exemplary operations for training a machine learning (ML) model for completion of data gaps in a dataset, in accordance with an embodiment of the disclosure.

FIG. 4A is a diagram that illustrates first exemplary operations for training a machine learning (ML) model for completion of data gaps in a dataset, in accordance with an embodiment of the disclosure. FIG. 4A is explained in conjunction with elements from FIG. 1, FIG. 2, FIG. 3A, and FIG. 3B. With reference to FIG. 4A, there is shown the block diagram 400A that illustrates exemplary operations from 402 to 412, as described herein. The exemplary operations illustrated in the block diagram 400A start at 402 and are performed by any computing system, apparatus, or device, such as by the computer 102 of FIG. 1 or by the computer system 202 of FIG. 2. Although illustrated with discrete blocks, the exemplary operations associated with one or more blocks of the block diagram 400A can be divided into additional blocks, combined into fewer blocks, or eliminated, depending on the implementation.

At 402, a first ML model training operation is performed. In the first ML model training operation, the computer system 202 trains the first ML model 208 based on the first portion and the second portion of the first training dataset 216. The first ML model 208 is trained to predict the first value of the first metric based on the first portion and the second portion of the first training dataset 216. In an embodiment of the disclosure, the computer system 202 trains the first ML model 208 to predict the first value of the first metric based on the one or more metrics 214A in the first training dataset 216.

In the training of the first ML model 208, the computer system 202 removes the first metric from the first training dataset 216 and provides the first ML model 208 with the first training dataset 216 (the first portion and the second portion). The first ML model 208 analyzes the one or more metrics 214A to determine a formula for the prediction of the first value of the first metric based on the one or more metrics 214A. The formula for the prediction of the first metric can be represented in the equation (6), the equation (7), and the equation (8) as given below:

$$\gamma = \sum_{i=1}^{n} w_i a_i$$

(when the multiplicative relationship is absent) (6)

$$\gamma = \sum_{i=1}^{j} w_i a_i$$

(when the multiplicative relationship is present) (7)

$$\gamma = \sum_{\substack{i=\{1,\ldots\ p\} \\ j=\{1,\ldots q\}}} w_i m_i^j$$

(in case of non-linear regression training) (8)

where, n=total count of the one or more metrics 214A in the first training dataset 216, j=total count of the one or more metrics in the training data after the identification of the multiplicative relationship, $a_i$=the one or more metrics 214A in the first training dataset 216, w=weights of the neural network corresponding to the first ML model 208, m=constant of the first multiplicative relationship (for example, if y=2*x, then m=2), p=total count of the one or more metrics 214A in the first training dataset 216 when the multiplicative relationship is identified), and q=degree of the polynomial equation of non-linear regression (2 in case of quadratic equation, 3 in case of cubic equations, and the like).

In an embodiment of the disclosure, the training of the first ML model 208 corresponds to the tuning of one or more hyper-parameters (the weights and the regularization parameters) associated with the first ML model 208 based on the first portion and the second portion of the first training dataset 216. In an embodiment of the disclosure, the computer system 202 adjusts the weights and the regularization parameters of the neural network corresponding to the first ML model 208 based on a determination that the predicted first value of the first metric and the second value (the actual value) of the first metric are not equal. The computer system 202 repeats the adjustment of the weights and the regularization parameters until the minima of the loss function is achieved or the training error is minimized.

At 404, a first value prediction operation is performed. In the first value prediction operation, the computer system 202 predicts the first value of the first metric based on the trained first ML model 208. Specifically, the computer system 202 applies the trained first ML model 208 to predict a first set of values of the first metric. Each value of the first set of values includes the predicted first value of the first metric at a corresponding timestamp. By way of example, and not by limitation, the computer system 202 predicts the first set of values that includes the predicted first value of the first metric at the corresponding timestamp (10:00 AM: 26%, 10:01 AM: 39%, 10:02 AM: 51%, 10:03 AM: 66%, 10:04 AM: 75%, 10:05 AM: 100%). The predicted first metric can be represented in the Table 11 below:

TABLE 11

| Predicted First Metric | |
|---|---|
| Timestamp | Predicted First Metric |
| 10:00 AM | 26% |
| 10:01 AM | 39% |
| 10:02 AM | 51% |
| 10:03 AM | 66% |
| 10:04 AM | 75% |
| 10:05 AM | 100% |

At 406, a first variance value determination operation is performed. In the first variance value determination operation, the computer system 202 determines a first variance value for the trained first ML model 208 based on the predicted first value and the second value (the actual value) of the first metric. Variance value is indicative of the performance (accuracy) of the first ML model 208 in predictions. In an embodiment of the disclosure, the computer system 202 compares the predicted first value of the first metric at each timestamp with the second value (the actual value) of the first metric at the corresponding timestamp to determine the first variance value. In an embodiment of the disclosure, the computer system 202 determines the first variance value based on the formula given below in equation (9):

$$V = \frac{\sum (x_i - \overline{x_i})^2}{n - 1} \tag{9}$$

where,

V=variance value, $x_i$=predicted value of the metric at the corresponding timestamp, $\overline{x_i}$=actual value of the metric at the corresponding timestamp, and n=count of values in the metric.

By way of example, and not by limitation, the computer system 202 compares the predicted first value with the second value (the actual value) (10:00 AM: 25%, 10:01 AM: 40%, 10:02 AM: 50%, 10:03 AM: 65%, 10:04 AM: 75%, 10:05 AM: 100%) to determine the first variance value as 0.125.

At 408, it is determined whether the first variance value is less than or equal to a variance threshold. In an embodiment, the computer system compares the first variance value with the variance threshold. The variance threshold is a threshold parameter that is used to ensure that the performance (accuracy) of the first ML model 208 is greater than a threshold performance (accuracy). In an embodiment of the disclosure, the computer system 202 determines that the first variance value is less than or equal to the variance threshold based on the comparison. In an alternate embodiment of the disclosure, the computer system 202 determines that the first variance value is greater than the variance threshold based on the comparison. Based on the determination that the first variance value is less than or equal to the variance threshold, the control of operations proceeds to 410, otherwise the control of operations proceeds to 412 (described in the description of FIG. 4B). By way of example, and not by limitation, the variance threshold can be 0.05.

The control of operations proceeds to 410 to deploy the first ML model 208 for data completion after ensuring that the first variance value is less than or equal to the variance threshold, which ensures that the performance (accuracy) of the first ML model 208 is greater than a threshold performance (accuracy). The control of operations proceeds to 412 to further continue the training of the first ML model 208 to ensure that the performance (accuracy) of the first ML model 208 is greater than a threshold performance (accuracy).

At 410, a first ML model output operation is performed. In the first ML model output operation, the computer system 202 outputs the trained first ML model 208 based on the determination that the first variance value is less than or equal to the variance threshold. In an embodiment of the disclosure, the computer system 202 deploys the trained first ML model 208 for performing data completion to enhance anomaly detection. The computer system 202 deploys the first ML model 208 for data completion after ensuring that the first variance value is less than or equal to the variance threshold, which ensures that the performance (accuracy) of the first ML model 208 is greater than a threshold performance (accuracy). In an alternate embodiment of the disclosure, the computer system 202 stores the trained first ML model 208 into the server 212 for performing data completion to enhance anomaly detection.

Figure 4B:
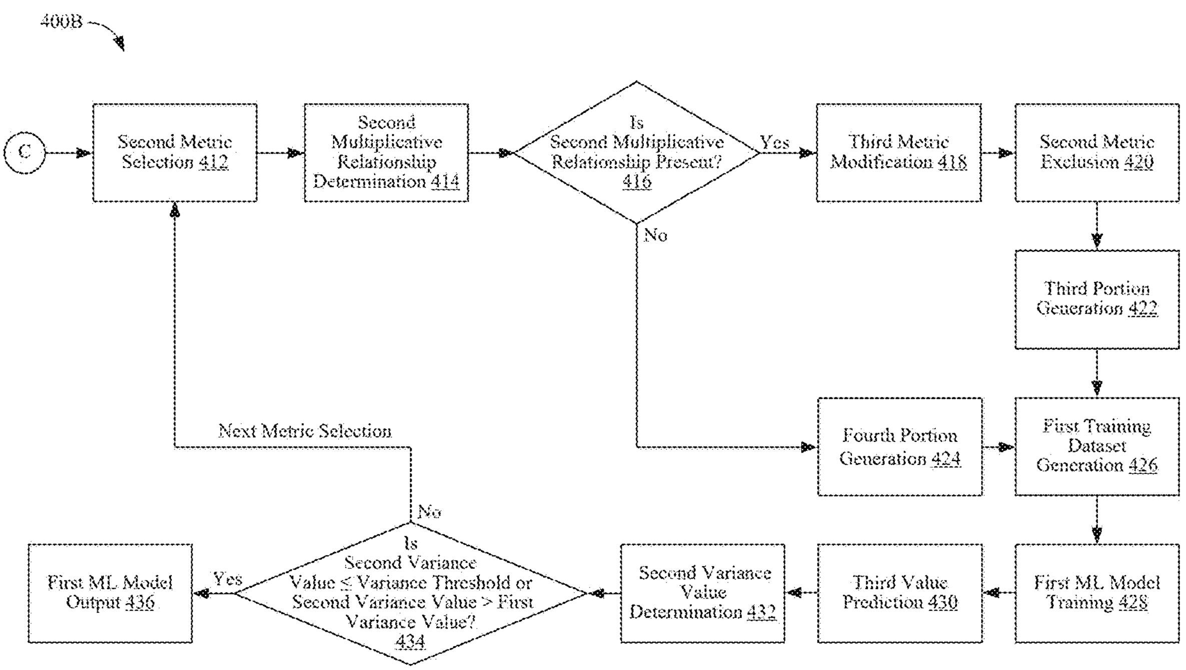
FIG. 4B is a diagram that illustrates second exemplary operations for training a machine learning (ML) model for completion of data gaps in a dataset, in accordance with an embodiment of the disclosure.

FIG. 4B is a diagram that illustrates second exemplary operations for training a machine learning (ML) model for completion of data gaps in a dataset, in accordance with an embodiment of the disclosure. FIG. 4B is explained in conjunction with elements from FIG. 1, FIG. 2, FIG. 3A, FIG. 3B, and FIG. 4A. With reference to FIG. 4B, there is shown the block diagram 400B that illustrates exemplary operations from 412 to 436, as described herein. The exemplary operations illustrated in the block diagram 400B start at 412 and are performed by any computing system, apparatus, or device, such as by the computer 102 of FIG. 1 or by the computer system 202 of FIG. 2. Although illustrated with discrete blocks, the exemplary operations associated with one or more blocks of the block diagram 400B can be divided into additional blocks, combined into fewer blocks, or eliminated, depending on the implementation.

At 412, a second metric selection operation is performed. In the second metric selection operation, the computer system 202 selects the second metric from the one or more metrics 214A based on the determination that the first variance value is greater than the variance threshold. The computer system 202 selects the second metric from each cluster of the set of clusters. By way of example, and not a limitation, the computer system 202 selects the second metric associated with memory utilization (10:00 AM: 4 GB of 16 GB, 10:01 AM: 6 GB of 16 GB, 10:02 AM: 8 GB of 16 GB, 10:02 AM: 10 GB of 16 GB, 10:04 AM: 12 GB of 16 GB, 10:05 AM: 20 GB of 16 GB).

At 414, a second multiplicative relationship determination operation is performed. In the second multiplicative relationship determination operation, the computer system 202 similarly determines the one of the presence or the absence of a second multiplicative relationship between the second metric and the third metric of the one or more metrics 214A based on the determination that the first variance value is greater than the variance threshold. The computer system 202 similarly applies the third ML model to each metric of the one or more metrics 214A to determine one of the presence or the absence of the second multiplicative relationship as discussed above. Details about the multiplicative relationship determination and the third ML model are provided, for example, in FIG. 3B.

By way of example, and not by limitation, the computer system determines the presence of the second multiplicative relationship between the second metric (memory utilization) and the third metric (disc read operations). The computer system 202 determines that the increase in the third metric corresponds to the increase in the second metric (memory utilization). Further, the computer system 202 determines that when the memory utilization increases twice from a first timestamp (10:00 AM: 4 GB of 16 GB) to a second timestamp (10:02 AM: 8 GB of 16 GB), the number of read operations also increases two times from the first timestamp (10:00 AM: 200 reads) to the second timestamp (10:02 AM: 400 reads). Similarly, the computer system 202 determines the second multiplicative relationship between the second metric and the one or more metrics 214A.

At 416, it is determined that the second multiplicative relationship is present. In an embodiment of the disclosure, the computer system 202 determines the presence of the second multiplicative relationship between the second metric and the third metric. In an alternate embodiment of the disclosure, the computer system 202 determines the absence of the second multiplicative relationship. Based on the determination that the second multiplicative relationship is present, the control of operations moves to 418, otherwise, the control of operations moves to 424. The control of operations moves to 418 at which the third metric is expressed in terms of the second metric based on the second multiplicative relationship. The modification of the third metric reduces the time of the first ML model 208 for the identification of the patterns and the relationships that in turn reduces the overall time for training of the first ML model 208 and increases the performance (accuracy) of the first ML model 208 for performing data completion.

At 418, a third metric modification operation is performed. In the third metric operation, the computer system 202 modifies the third metric in the grouped data based on the determination of the presence of the second multiplicative relationship. The computer system 202 transforms the third metric in the grouped data based on the identified second multiplicative relationship.

By way of example, and not by limitation, the modified second metric (memory utilization) can be represented in Table 12 as given below:

TABLE 12

| Modified Third Metric (Based on Second Multiplicative relationship) | | |
|---|---|---|
| Timestamp | Third Metric | Modified Third Metric |
| 10:00 AM | 200 | 200 |
| 10:02 AM | 400 | 2*200 |
| 10:04 AM | 600 | 3*200 |
| 10:05 AM | 10000 | 10000 |

At 420, a second metric exclusion operation is performed. In the second metric exclusion operation, the computer system 202 excludes the second metric from the modified grouped data (that includes the modified third metric) for the generation of a third portion of the first training dataset 216. By way of example, and not by limitation, the computer system 202 excludes the second metric associated with the memory utilization from the grouped data for the generation of the third portion of the first training dataset 216.

At 422, a third portion generation operation is performed. In the third portion generation operation, the computer system 202 generates the third portion of the first training dataset 216 for training the first ML model 208. In an embodiment of the disclosure, the computer system 202 generates the third portion of the first training dataset 216 based on the modified third parameter upon the determination of the presence of the second multiplicative relationship. The second metric is excluded from the third portion of the first training dataset 216 and the third metric is modified in the third portion of the first training dataset 216 based on the second multiplicative relationship.

By way of example, and not by limitation, the computer system 202 generates the third portion of the first training dataset 216. The third portion of the first training dataset 216 can be represented in Table 13 as provided below:

TABLE 13

| Third Portion of the First Training Dataset | | |
|---|---|---|
| Timestamp | Disc read operations | Disc write operations |
| 10:00 AM | 200 | 100 |
| 10:02 AM | 2*200 | 2*100 |
| 10:04 AM | 3*200 | 3*100 |
| 10:05 AM | 100000 | 100000 |

At 424, a fourth portion generation operation is performed. In the fourth portion generation operation, the computer system 202 generates the fourth portion of the first training dataset 216 based on the determination of the absence of the second multiplicative relationship. The fourth portion of the first training dataset 216 is inclusive of the second metric. The second metric is included in the fourth portion of the first training dataset 216 based on the determination of the absence of the second multiplicative relationship. By way of example, the fourth portion of the first training dataset 216 can be represented in Table 14 below:

TABLE 14

| Fourth Portion of the First Training dataset | | | | |
|---|---|---|---|---|
| Timestamp | CPU Utilization | Memory Utilization | Disc read operations | Disc write operations |
| 10:00 AM | 25% | 4 GB of 16 GB | 200 | 100 |
| 10:01 AM | 40% | 6 GB of 16 GB | 300 | 150 |
| 10:03 AM | 65% | 10 GB of 16 GB | 500 | 250 |
| 10:05 AM | 100% | 16 GB of 16 GB | 100000 | 100000 |

At 426, a first training dataset generation operation is performed. In the first training dataset generation operation, the computer system 202 generates the first training dataset 216 based on the third portion and the fourth portion. In an embodiment of the disclosure, the computer system 202 combines the third portion and the fourth portion to generate the first training dataset 216. In an embodiment of the disclosure, the computer system 202 generates the first training dataset 216 for the training of the first ML model 208.

At 428, a first ML model training operation is performed. In the first ML model training operation, the computer system 202 trains the first ML model 208 based on the third portion and the fourth portion of the first training dataset 216. The first ML model 208 is trained to predict a third value of the second metric based on the third portion and the fourth portion of the first training dataset 216. In an embodiment of the disclosure, the computer system 202 trains the first ML model 208 to predict the third value of the second metric based on the one or more metrics 214A in the third portion and the fourth portion of first training dataset 216.

In the training of the first ML model 208, the computer system 202 similarly removes the second metric from the first training dataset 216 and provides the first ML model 208 with the first training dataset 216. The first ML model 208 analyzes the one or more metrics 214A to determine the formula for the prediction of the third value of the second metric based on the one or more metrics 214A. The formula is described in equations (6), (7), and (8) as discussed above in FIG. 4A. In an embodiment of the disclosure, the computer system 202 similarly tunes the one or more hyperparameters associated with the first ML model 208 based on the first training dataset 216 for the prediction of the third value of the second metric until the minima of the loss function is achieved or the training error is minimized as discussed above.

At 430, a third value prediction operation is performed. In the third value prediction operation, the computer system 202 predicts the third value of the second metric based on the application of the first ML model 208 to the first training dataset 216. Specifically, the computer system 202 applies the first ML model 208 to predict a second set of values of the second metric. Each value of the second set of values includes the predicted first value of the first metric at a corresponding timestamp. By way of example, and not by limitation, the computer system 202 predicts the second set of values that includes the predicted third value of the second metric at corresponding timestamp (10:00 AM: 4 GB of 16 GB, 10:01 AM: 6.01 GB of 16 GB, 10:02 AM: 8 GB of 16 GB, 10:03 AM: 10.02 GB of 16 GB, 10:04 AM: 12.01 GB of 16 GB, 10:05 AM: 16 GB of 16 GB). The predicted second metric can be represented in the Table 15 below:

TABLE 15

| Predicted Second Metric | |
|---|---|
| Timestamp | Predicted First Metric |
| 10:00 AM | 4 GB of 16 GB |
| 10:01 AM | 6.01 GB of 16 GB |
| 10:02 AM | 8 GB of 16 GB |
| 10:03 AM | 10.02 GB of 16 GB |
| 10:04 AM | 12.01 GB of 16 GB |
| 10:05 AM | 16 GB of 16 GB |

At 432, a second variance value determination is performed. In the second variance value determination operation, the computer system 202 determines a second variance value for the trained first ML model 208 based on the predicted third value of the second metric and a fourth value (the actual value) of the second metric. Variance value is indicative of the performance (accuracy) of the first ML model 208 in predictions. In an embodiment of the disclosure, the computer system 202 compares the predicted third value of the second metric at each timestamp with the fourth value (the actual value) of the second metric at the corresponding timestamp to determine the second variance value. In an embodiment of the disclosure, the computer system 202 determines the second variance value based on the formula given in equation (9) as discussed above.

By way of example, and not by limitation, the computer system 202 compares the predicted third value with the fourth value (the actual value) (10:00 AM: 4 GB of 16 GB, 10:01 AM: 6 GB of 16 GB, 10:02 AM: 8 GB of 16 GB, 10:03 AM: 10 GB of 16 GB, 10:04 AM: 12 GB of 16 GB, 10:05 AM: 20 GB of 16 GB) to determine the second variance value as 0.045.

At 434, it is determined whether the second variance value is less than or equal to a variance threshold or the second variance value is greater than the first variance value. In an embodiment of the disclosure, the computer system 202 determines that the second variance value is less than or equal to the variance threshold. In an alternate embodiment of the disclosure, the computer system 202 determines that the first variance value is greater than the variance threshold. In an embodiment of the disclosure, the computer system 202 determines that the second variance value is greater than the first variance value. In an alternate embodiment of the disclosure, the computer system 202 determines that the second variance value is less than or equal to the first variance value.

Based on the determination that the second variance value is less than or equal to the variance threshold or the determination that the second variance value is greater than the first variance value, the control of operations proceeds to 436, otherwise, the control of operations moves back to 412 (for next metric selection and further training). By way of example, and not by limitation, the variance threshold can be 0.05. The control of operations proceeds to 436 to deploy the first ML model 208 for data completion after ensuring that the second variance value is less than or equal to the variance threshold or the second variance value is greater than the first variance value. This ensures that the performance (accuracy) of the first ML model 208 is greater than the threshold performance (accuracy) and the first ML model 208 is not overfit for the first training dataset 216. The control of operations proceeds to 412 based on the determination that the second variance value is greater the variance threshold or the second variance value is less than or equal to the first variance value to further continue the training of the first ML model 208 to ensure that the performance (accuracy) of the first ML model 208 is greater than a threshold performance (accuracy).

In an alternate embodiment of the disclosure, the computer system 202 further obtains a validation dataset from the first training dataset 216 based on a threshold ratio. The threshold ratio can be for example 4:1. The validation dataset includes one-fifth data points as compared to the first training dataset 216. The computer system 202 further applies the first ML model 208 to predict one or more values of the one or more metrics 214A of the validation dataset. The computer system 202 further determines a third variance value (validation set variance) for the first ML model 208 based on a comparison of the predicted one or more values of the validation dataset with the actual one or more values in the validation dataset.

To prevent overfitting of the first ML model 208 to the first training dataset 216, the computer system 202 further compares the third variance value with the first variance value and the second variance value (and the next variance value in case of further iterations). In case the computer system 202 determines that the third variance value is greater than or equal to either the first variance value or the second variance value (or the next variance value) based on the comparison, then the computer system 202 proceeds the control of operations to 436 to deploy the first ML model 208 to prevent overfitting.

In an embodiment of the disclosure, the control of operations moves back to 412 to further train the first ML model 208 for predictions of next metrics of the one or more metrics 214A based on the determination that the second variance value is less than or equal to the first variance value but greater than the variance threshold and the third variance value. The computer system 202 similarly trains the first ML model 208 based on the next metric and next multiplicative relationships to ensure that the performance (accuracy) of the first ML model is greater than or equal to the threshold performance (accuracy).

At 436, a first ML model output operation is performed. In the first ML model output operation, the computer system 202 outputs the trained first ML model 208 based on the determination that the second variance value is less than or equal to the variance threshold. In an alternate embodiment of the disclosure, the computer system 202 outputs the trained first ML model 208 based on the determination that the second variance value is greater than the first variance value. In an alternate embodiment of the disclosure, the computer system 202 outputs the trained first ML model 208 based on the determination that one of the first variance value, the second variance value, or the next variance value is less than or equal to the third variance value (the validation set variance). In an embodiment of the disclosure, the computer system 202 deploys the trained first ML model 208 for performing data completion to enhance anomaly detection. The computer system 202 deploys the first ML model 208 for data completion after ensuring that the second variance value is less than or equal to the variance threshold, which ensures that the performance (accuracy) of the first ML model 208 is greater than a threshold performance (accuracy).

Figure 5:
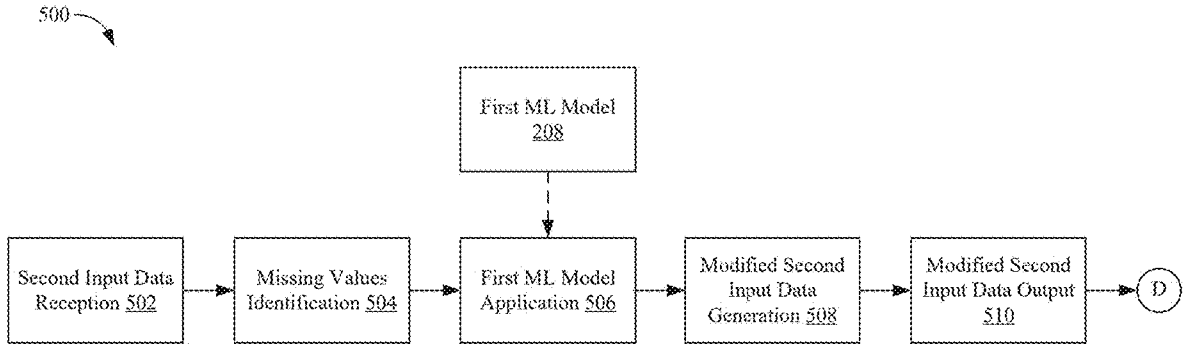
FIG. 5 is a diagram that illustrates exemplary operations completion of data gaps in a dataset, in accordance with an embodiment of the disclosure.

FIG. 5 is a diagram that illustrates exemplary operations for completion of data gaps in a dataset, in accordance with an embodiment of the disclosure. FIG. 5 is explained in conjunction with elements from FIG. 1, FIG. 2, FIG. 3A, FIG. 3B, FIG. 4A, and FIG. 4B. With reference to FIG. 5, there is shown the block diagram 500 that illustrates exemplary operations from 502 to 510, as described herein. The exemplary operations illustrated in the block diagram 500 start at 502 and are performed by any computing system, apparatus, or device, such as by the computer 102 of FIG. 1 or by the computer system 202 of FIG. 2. Although illustrated with discrete blocks, the exemplary operations associated with one or more blocks of the block diagram 500 can be divided into additional blocks, combined into fewer blocks, or eliminated, depending on the implementation.

At 502, a second input reception operation is performed. In the second input reception operation, the computer system 202 receives a second input that includes at least one metric associated with the specific user device 210. The one or more metrics 214A are inclusive or exclusive of the at least one metric. By way of example, and not by limitation, the computer system 202 receives a first metric associated with CPU utilization of the specific user device 210 and a second metric associated with the memory utilization of the specific user device 210. The second input can be represented in the Table 16 below:

TABLE 16

| Second Input Data | | |
|---|---|---|
| Timestamp | CPU utilization | Memory Utilization |
| 10:00 AM | 30% | 4 GB of 16 GB |
| 10:01 AM | 45% | |
| 10:02 AM | | 8 GB of 16 GB |
| 10:03 AM | 75% | |
| 10:04 AM | | 12 GB of 16 GB |
| 10:05 AM | 100% | |

At 504, a missing values identification operation is performed. In the missing values identification operations, the computer system 202 identifies one or more missing values in the second input data. The one or more missing values correspond to one or more sections in the second input data where values are absent. The one or more missing values can lead to inaccurate anomaly detection. In an embodiment of the disclosure, the computer system 202 parses the second input data to identify the one or more missing values. By way of example, and not by limitation, the computer system 202 identifies that the one or more values of CPU utilization are missing at 10:02 AM and 10:04 AM and the one or more values of memory utilization are missing at 10:01 AM, 10:03 AM, and 10:05 AM.

At 506, a first ML model application operation is performed. In the first ML model application operation, the computer system 202 applies the first ML model 208 to the second input data. The first ML model 208 is trained to perform data completion, and more specifically, to predict one or more values corresponding to the one or more missing values in the second input data. The first ML model 208 identifies patterns and relationships between the metrics of the second input data based on the first training dataset 216 and predicts the one or more values corresponding to the one or more missing values.

At 508, a modified second input data generation operation is performed. In the modified second input data generation operation, the computer system 202 generates modified second input data based on the application of the first ML model 208 to the second input data. The modified second input data includes the one or more values corresponding to the one or more missing values. The modified second input data can be represented in the Table 17 given below:

TABLE 17

| Modified Second Input Data | | |
|---|---|---|
| Timestamp | CPU utilization | Memory Utilization |
| 10:00 AM | 30% | 4 GB of 16 GB |
| 10:01 AM | 45% | 6 GB of 16 GB |
| 10:02 AM | 60% | 8 GB of 16 GB |
| 10:03 AM | 75% | 10 GB of 16 GB |
| 10:04 AM | 90% | 12 GB of 16 GB |
| 10:05 AM | 100% | 16 GB of 16 GB |

At 510, a modified second input data output operation is performed. In the modified second input data output operation, the computer system 202 outputs the modified second input data. In an embodiment of the disclosure, the computer system 202 renders the modified second input data on the specific user device 210. In an alternate embodiment of the disclosure, the computer system 202 transmits and stores the modified second input data into the one or more data sources 204 for performing anomaly detection which is described in FIG. 6 and its corresponding description.

Figure 6:
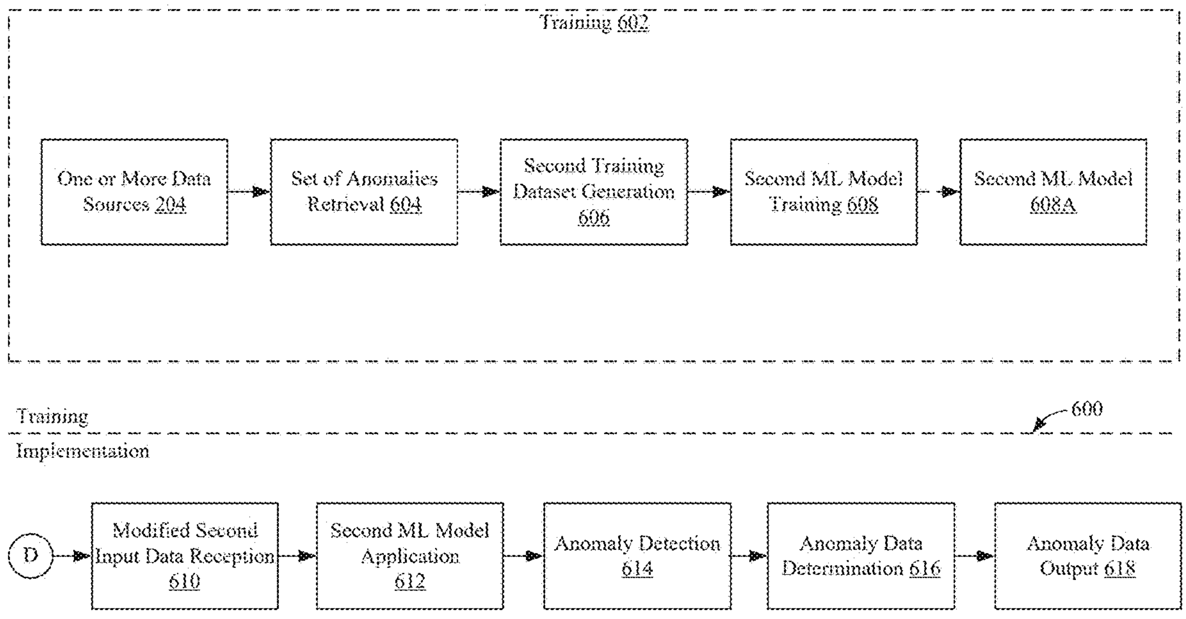
FIG. 6 is a diagram that illustrates exemplary operations for training a machine learning (ML) model for anomaly detection, in accordance with an embodiment of the disclosure.

FIG. 6 is a diagram that illustrates training of a machine learning (ML) model for performing anomaly detection, in accordance with an embodiment of the disclosure. FIG. 6 is explained in conjunction with FIG. 1, FIG. 2, FIG. 3A, FIG. 3B, FIG. 4A, FIG. 4B, and FIG. 5. As shown, there is a training portion above line 600 and an implementation portion below line 600. With reference to FIG. 6, there is further shown a second ML model 608A. In the training portion above line 600, the computer system 202 retrieves a set of anomalies associated with the one or more user devices 206 to generate a second training dataset for the training 602 of the second ML model 608A.

At 604, a set of anomalies retrieval operation is performed. In the set of anomalies retrieval operation, the computer system 202 retrieves the set of anomalies associated with each user device of the one or more user devices 206. An anomaly is defined as any deviation from the expected behavior or performance of a user device, application, or process. This deviation can manifest as unexpected patterns, behaviors, or events that may indicate potential issues, malfunctions, or security threats within the user device. By way of example, and not by limitation, the set of anomalies include a system overload due to high CPU utilization, a system overload due to excessive memory usage, a system failure due to insufficient memory allocation, a system slowdown due to excessive network latency a system overload due to high disk I/O operations, a system anomaly due to unexpected spikes in application logs, and the like.

At 606, a second training dataset generation operation is performed. In the second training dataset generation operation, the computer system 202 generates the second training dataset for training the second ML model 608A. The second training dataset includes a set of input data and a set of output data. The set of input data includes the one or more metrics 214A associated with the one or more user devices 206. The set of output data includes the set of anomalies associated with each user device of the one or more user devices 206. By way of example, and not by limitation, the second training dataset can be shown in Table 18 as given below:

TABLE 18

| Second Training Dataset | | |
|---|---|---|
| User Device | Input Data (One or More Metrics Analyzed) | Output Data (Set of Anomalies) |
| First User Device | CPU utilization, Memory utilization | System overload (excessive CPU and memory usage) |
| Second User Device | Memory Utilization | System overload (excessive memory usage) |
| Third User Device | Disc I/O operations | System overload (high disc I/O operations) |
| Fourth User Device | Network Traffic | System slowdown (excessive network latency) |

At 608, a second ML model training operation is performed. In the second ML model training operation, the computer system 202 trains the second ML model 608A based on the second training dataset. In an embodiment of the disclosure, the computer system 202 trains the second ML model 608A for performing anomaly detection based on the second training dataset. The second ML model 608A corresponds to a neural network-based regression model. The neural network is a computational network or a system of artificial neurons, arranged in a plurality of layers, as nodes. The plurality of layers of the neural network may include an input layer, one or more hidden layers, and an output layer. Each layer of the plurality of layers may include one or more nodes (or artificial neurons).

Outputs of all nodes in the input layer may be coupled to at least one node of the hidden layer(s). Similarly, the inputs of each hidden layer are coupled to outputs of at least one node in various layers of the neural network. Outputs of each hidden layer may be coupled to inputs of at least one node in various layers of the neural network. Node(s) in the final layer may receive inputs from at least one hidden layer to output a result. The number of layers and the number of nodes in each layer may be determined from hyper-parameters of the neural network. Such hyper-parameters may be set before or while training the neural network on the training dataset. Each node of the neural network corresponds to a mathematical function (e.g., a sigmoid 2 function or a rectified linear unit) with a set of parameters, tunable during the training of the neural network. The set of parameters includes, for example, a weight parameter, a regularization parameter, and the like. Each node uses the mathematical function to compute an output based on one or more inputs from nodes in various layer(s) (e.g., previous layer(s)) of the neural network. All or some of the nodes of the neural network correspond to the same or a different mathematical function.

In the training of the second ML model 608A, one or more parameters of each node of the second ML model 608A may be updated based on whether an output of the final layer for a given input (from the second training dataset) matches a correct result based on a loss function for the second ML model 608A. The above process may be repeated for the same or a different input until a minima of loss function may be achieved, and a training error may be minimized.

In the training of the second ML model 608A, the computer system 202 provides the first ML model 208 with the second training dataset. The second ML model 608A analyzes the set of input data (the one or more metrics 214A) and the set of output data (the set of anomalies) in the second training dataset to determine an ML algorithm for the detection of an anomaly based on the one or more metrics 214A. The second ML model 608A utilizes the ML algorithm for the detection of the anomaly (more specifically, for the prediction of the set of output data based on the set of input data).

In an embodiment of the disclosure, the computer system 202 further adjusts the one or more hyperparameters (weights and the regularization parameters) of the neural network corresponding to the second ML model 608A based on a determination that an input from the set of input data matches a corresponding output in the set of output data upon the prediction. The computer system 202 repeats the adjustment of the weights and the regularization parameters until the minima of the loss function is achieved or the training error is minimized as discussed above.

In an embodiment of the disclosure, the computer system 202 stores the second ML model 608A. In an alternate embodiment of the disclosure, the second ML model 608A is embodied as a cloud-based service, a cloud-based application, or a cloud-based platform. Examples of the second ML model 608A include one of but are not limited to, an artificial neural network (ANN), a deep neural network (DNN), a convolutional neural network (CNN), a fully connected neural network, and/or a combination of such networks.

In the implementation portion below line 600, a modified second input data reception operation 610 is performed. In the modified second input data reception operation, the computer system 202 receives the modified second input data. As discussed above, the computer system 202 generates and stores the modified second input data into the one or more data sources 204. Thereafter, the modified second input data is received from the one or more data sources 204 for performing anomaly detection. An exemplary modified second input data (generated by the computer system 202) is provided in FIG. 5.

At 612, a second ML model application operation is performed. In the second ML model application operation, the computer system 202 applies the second ML model 608A to the modified second input data. The second ML model 608A is trained to detect an anomaly associated with the specific user device 210 based on the modified second input data. The second ML model 608A analyzes the patterns and the relationships between the one or more metrics in the second input data based on the second training dataset and then detects the anomaly.

At 614, an anomaly detection operation is performed. In the anomaly detection operation, the computer system 202 detects the anomaly associated with the specific user device 210 based on the application of the second ML model 608A to the modified second input data. By way of example, and not by limitation, the computer system detects the anomaly as "high CPU utilization and excessive memory utilization".

At 616, an anomaly data determination operation is performed. In the anomaly data determination operation, the computer system 202 determines anomaly data associated with the specific user device 210 based on the detected anomaly. The anomaly data corresponds to a message that indicates the detected anomaly. In an embodiment of the disclosure, the computer system 202 determines the message as "system overload due to high CPU utilization and excessive memory utilization".

At 618, an anomaly data output operation is performed. In the anomaly output operation, the computer system 202 outputs the determined anomaly data. In an embodiment of the disclosure, the computer system 202 renders the determined anomaly data (the message) on the specific user device 210.

Figure 7A:
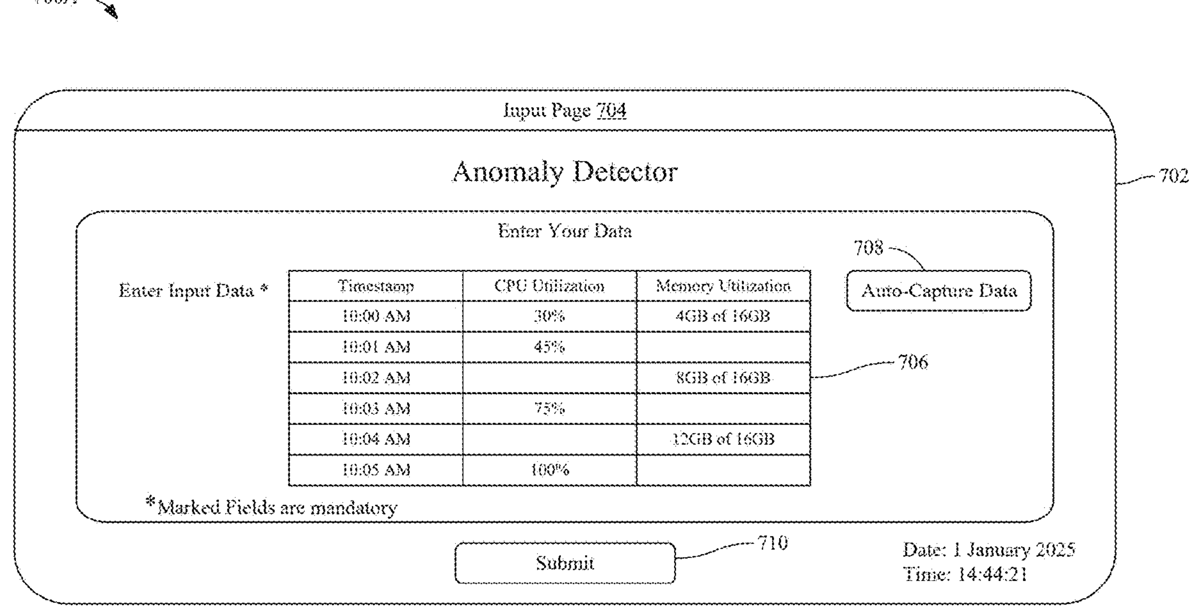
FIG. 7A is a diagram that illustrates an exemplary first user interface for completion of data gaps in a dataset, in accordance with an embodiment of the disclosure.

FIG. 7A is a diagram that illustrates an exemplary first user interface for completion of data gaps in a dataset, in accordance with an embodiment of the disclosure. FIG. 7A is explained in conjunction with elements from FIG. 1, FIG. 2, FIG. 3A, FIG. 3B, FIG. 4A, FIG. 4B, FIG. 5, and FIG. 6. With reference to FIG. 7A, there is shown an exemplary diagram 700A that includes a user device 702 and an input page 704. The input page 704 includes a first user interface (UI) element 706, a second UI element 708, and a third UI element 710. The user device 702 is an exemplary embodiment of the specific user device 210 of FIG. 2.

With reference to FIG. 7A, the computer system 202 renders the input page 704 on the user interface (UI) of the user device 702. The input page 704 corresponds to a web page or online form that is designed to collect information from an entity or a user who wishes to detect an anomaly associated with its user device or a user who wants to check the health of its user device. In an embodiment of the disclosure, the input page 704 is used to gather relevant details from the user to detect an anomaly associated with the user device 702.

The first UI element 706 corresponds to a textbox. The textbox is rendered as a table. The first UI element 706 is used to obtain the second input data associated with the user device 702. The first UI element is divided into a table where the second input data can be inputted by the user 218. The computer system 202 obtains the second input data via the first UI element 706. The second UI element 708 corresponds to a button labeled "Auto-Capture Data". Upon selecting the second UI element the computer system 202 automatically retrieves the second input data from the user device 702. The second input data is a mandatory input parameter that needs to be obtained for anomaly detection.

The third UI element 710 corresponds to a button labeled "Submit". Upon selecting the second UI element 708, the computer system 202 receives the input information (the second input data) and further initiates the anomaly detection. The computer system 202 applies the first ML model 208 to the second input data and generates the modified second input data (complete data) based on the application of the first ML model 208 to the second input data. The computer system 202 further applies the second ML model 608A to the modified second input data and then detects the anomaly associated with the user device 702. Details about the application of the first ML model 208, the second ML model 608A, the modified second input data generation, and the anomaly detection are provided, for example, in FIG. 5 and FIG. 6.

Figure 7B:
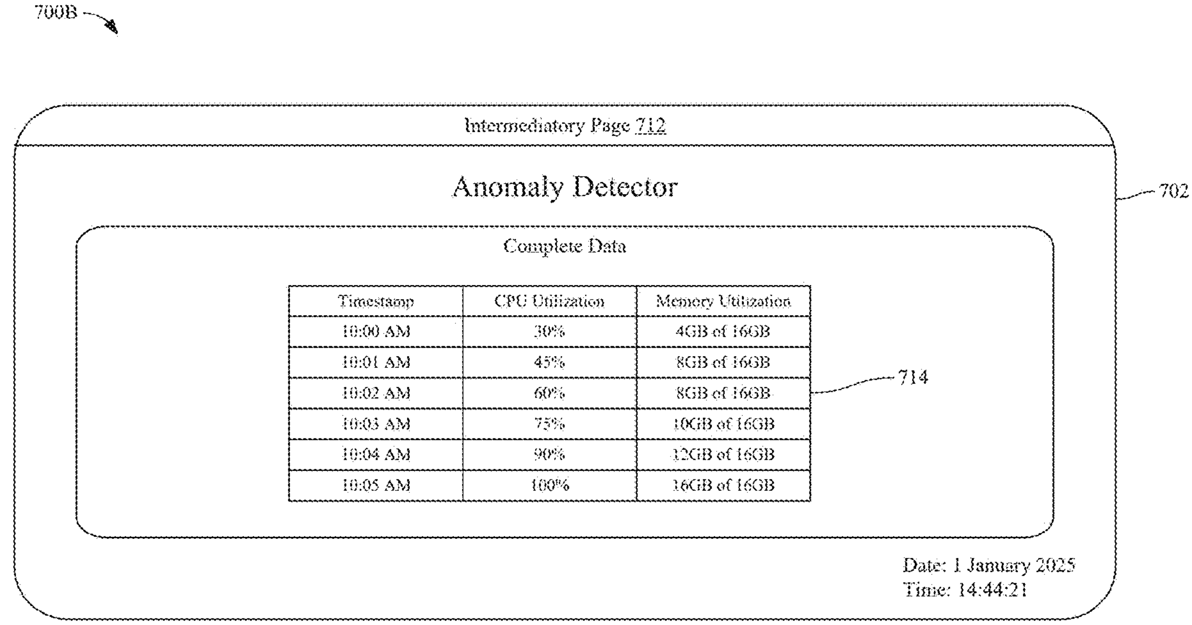
FIG. 7B is a diagram that illustrates an exemplary second user interface for completion of data gaps in a dataset, in accordance with an embodiment of the disclosure.

FIG. 7B is a diagram that illustrates an exemplary second user interface for completion of data gaps in a dataset, in accordance with an embodiment of the disclosure. FIG. 7B is explained in conjunction with elements from FIG. 1, FIG. 2, FIG. 3A, FIG. 3B, FIG. 4A, FIG. 4B, FIG. 5, FIG. 6, and FIG. 7A. With reference to FIG. 7B, there is shown an exemplary diagram 700B that includes the user device 702 and an intermediatory page 712. The intermediatory page 712 includes a fourth UI element 714. The user device 702 is an exemplary embodiment of the specific user device 210 of FIG. 2.

With reference to FIG. 7B, the computer system 202 renders the intermediatory page 712 on the display unit (or the user interface) of the user device 702. The computer system 202 renders the modified second input data (the complete data) on the intermediatory page 712. The fourth UI element 714 corresponds to a table. The fourth UI element 714 provides the information associated with the generated modified second input data (the complete data) to the user 218. Details about the generation of the modified second input data are provided, for example, in FIG. 5.

Figure 7C:
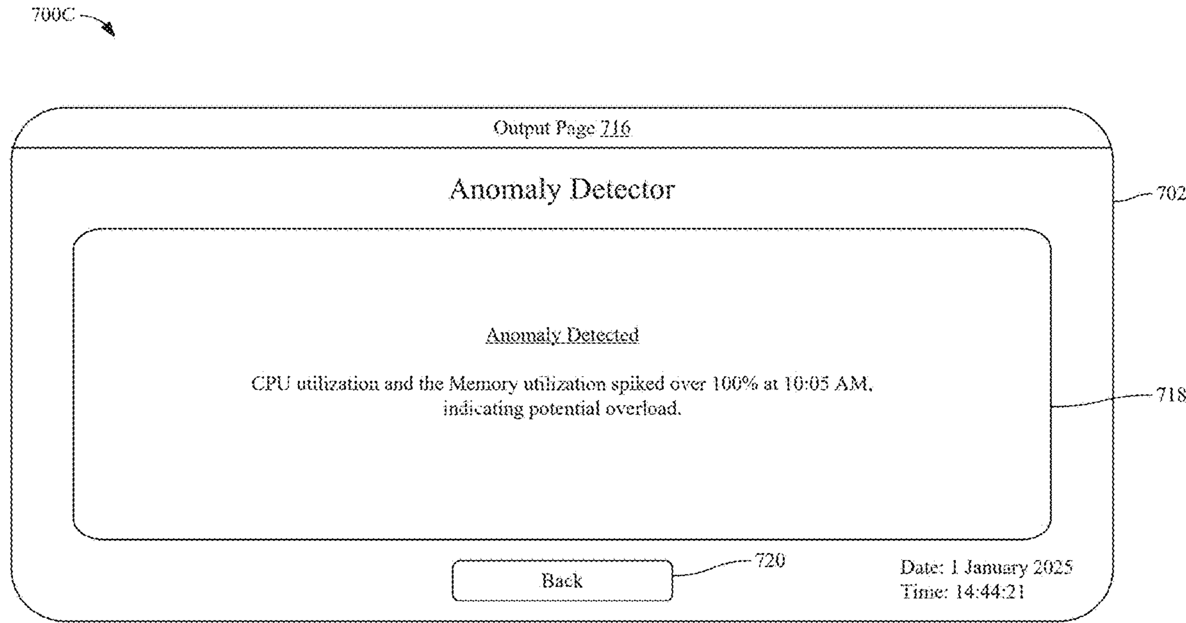
FIG. 7C is a diagram that illustrates an exemplary third user interface for completion of data gaps in a dataset, in accordance with an embodiment of the disclosure.

FIG. 7C is a diagram that illustrates an exemplary third user interface for completion of data gaps in a dataset, in accordance with an embodiment of the disclosure. FIG. 7C is explained in conjunction with elements from FIG. 1, FIG. 2, FIG. 3A, FIG. 3B, FIG. 4A, FIG. 4B, FIG. 5, FIG. 6, FIG. 7A, and FIG. 7B. With reference to FIG. 7C, there is shown an exemplary diagram 700C that includes the user device 702 and an output page 716. The output page 716 includes a fifth UI element 718 and a sixth UI element 720. The user device 702 is an exemplary embodiment of the specific user device 210 of FIG. 2.

With reference to FIG. 7C, the computer system 202 renders the output page 716 on the display unit (or the user interface) of the user device 702. The computer system 202 renders the detected anomaly on the user device 702. The fifth UI element 718 corresponds to a textbox that includes the detected anomaly, for example, "Anomaly Detected: CPU utilization and the Memory utilization spiked over 100% at 10:05 AM, indicating potential overload". The sixth UI element 720 corresponds to a button and is labeled as "Back". Upon Selecting the sixth UI element 720, the computer system 202 renders the input page 704 on the user device 702.

Figure 8:
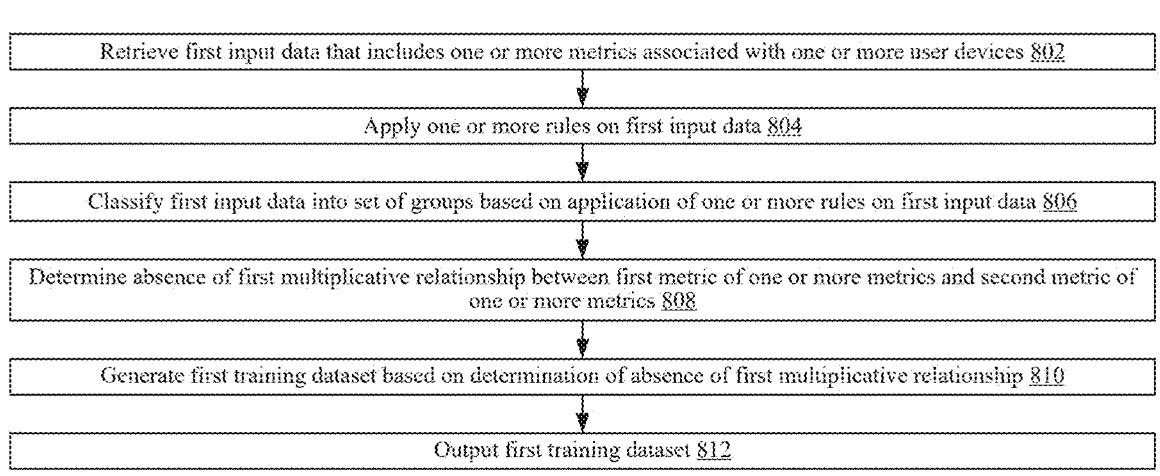
FIG. 8 is a diagram that illustrates a flowchart of an exemplary method for generation of a training dataset for completion of data gaps in a dataset, in accordance with an embodiment of the disclosure.

FIG. 8 is a diagram that illustrates a flowchart of an exemplary method for generation of a training dataset for completion of data gaps in a dataset, in accordance with an embodiment of the disclosure. FIG. 8 is explained in conjunction with elements from FIG. 1, FIG. 2, FIG. 3A, FIG. 3B, FIG. 4A, FIG. 4B, FIG. 5, FIG. 6, FIG. 7A, FIG. 7B and FIG. 7C. With reference to FIG. 8, there is shown a flowchart 800. The operations of the exemplary method may be executed by any computing system, for example, by the computer 102 of FIG. 1 or the computer system 202 of FIG. 2. The operations of the flowchart 800 may start at 802.

At 802, the first input data 214 that includes the one or more metrics 214A associated with the one or more user devices 206 is retrieved. In an embodiment of the disclosure, the computer system 202 retrieves the first input data 214 that includes the one or more metrics 214A associated with one or more user devices 206. Details about the first input data retrieval operation are provided, for example, in FIG. 1 and FIG. 3A.

At 804, the one or more rules are applied on the first input data 214. In an embodiment of the disclosure, the computer system 202 applies the one or more rules on the first input data 214. Details about the one or more rules application are provided, for example, in FIG. 1 and FIG. 3A.

At 806, the first input data 214 is classified into the set of groups based on the application of the one or more rules on the first input data 214. In an embodiment of the disclosure, the computer system 202 classifies the first input data 214 into the set of groups based on the application of the one or more rules on the first input data 214. Details about the set of groups classification are provided, for example, in FIG. 1 and FIG. 3A.

At 808, the absence of the first multiplicative relationship is determined between the first metric of the one or more metrics 214A and the second metric of the one or more metrics 214A. In an embodiment of the disclosure, the computer system 202 determines the absence of the first multiplicative relationship between the first metric of the one or more metrics 214A and the second metric of the one or more metrics 214A. Details about the first multiplicative relationship determination operation are provided, for example, in FIG. 1 and FIG. 3B.

At 810, the first training dataset 216 is generated based on the determination of the absence of the first multiplicative relationship. The first training dataset 216 is inclusive of the first metric. In an embodiment of the disclosure, the computer system 202 generates the first training dataset 216 based on the determination of the absence of the first multiplicative relationship. The first training dataset 216 is inclusive of the first metric. Details about the first training dataset generation operation are provided, for example, in FIG. 3B.

At 812, the first training dataset 216 is outputted. In an embodiment of the disclosure, the computer system 202 outputs the first training dataset 216. In an embodiment of the disclosure, the computer system 202 renders the first training dataset 216 on the specific user device 210. In an alternate embodiment of the disclosure, the computer system 202 stores the first training dataset 216 into the one or more data sources 204. Details about the first training dataset output operation are provided for example, in FIG. 1.

Figure 9:
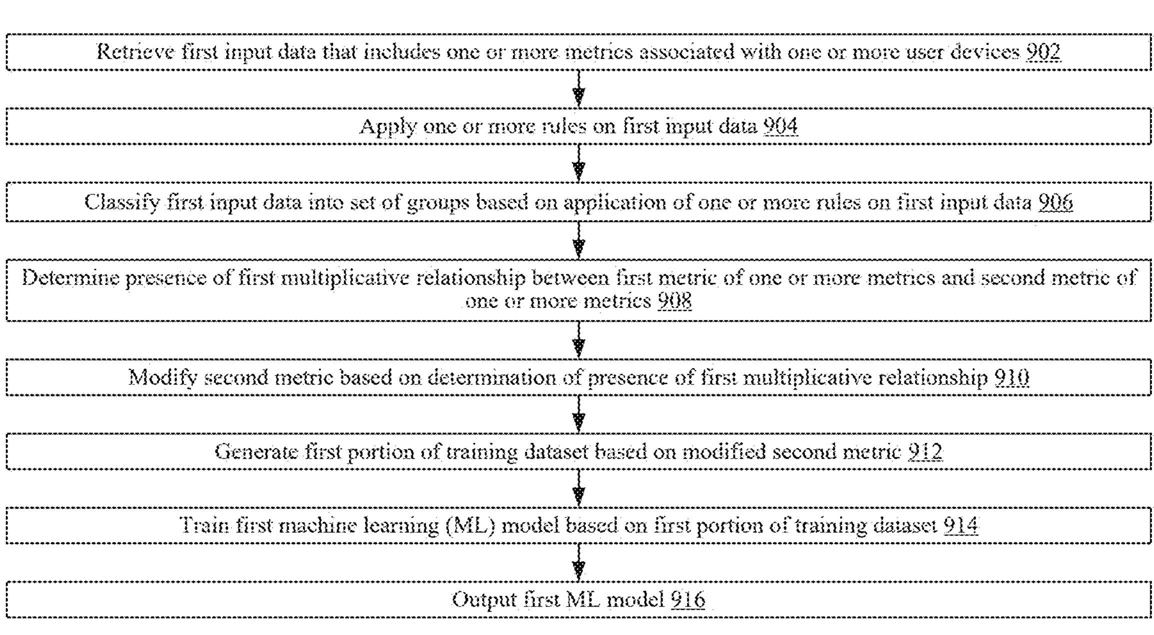
FIG. 9 is a diagram that illustrates a flowchart of an exemplary method for training a machine learning (ML) model for completion of data gaps in a dataset, in accordance with an embodiment of the disclosure.

FIG. 9 is a diagram that illustrates a flowchart of an exemplary method for training a machine learning (ML) model for completion of data gaps in a dataset, in accordance with an embodiment of the disclosure. FIG. 9 is explained in conjunction with elements from FIG. 1, FIG. 2, FIG. 3A, FIG. 3B, FIG. 4A, FIG. 4B, FIG. 5, FIG. 6, FIG. 7A, FIG. 7B, FIG. 7C, and FIG. 8. With reference to FIG. 9, there is shown a flowchart 900. The operations of the exemplary method may be executed by any computing system, for example, by the computer 102 of FIG. 1 or the computer system 202 of FIG. 2. The operations of the flowchart 900 may start at 902.

At 902, the first input data 214 that includes the one or more metrics 214A associated with the one or more user devices 206 is retrieved. In an embodiment of the disclosure, the computer system 202 retrieves the first input data 214 that includes the one or more metrics 214A associated with one or more user devices 206. Details about the first input data retrieval operation are provided, for example, in FIG. 1 and FIG. 3A.

At 904, the one or more rules are applied on the first input data 214. In an embodiment of the disclosure, the computer system 202 applies the one or more rules on the first input data 214. Details about the one or more rules application are provided, for example, in FIG. 1 and FIG. 3A.

At 906, the first input data 214 is classified into the set of groups based on the application of the one or more rules on the first input data 214. In an embodiment of the disclosure, the computer system 202 classifies the first input data 214 into the set of groups based on the application of the one or more rules on the first input data 214. Details about the set of groups classification are provided, for example, in FIG. 1 and FIG. 3A.

At 908, the presence of the first multiplicative relationship is determined between the first metric of the one or more metrics 214A and the second metric of the one or more metrics 214A. In an embodiment of the disclosure, the computer system 202 determines the presence of the first multiplicative relationship between the first metric of the one or more metrics 214A and the second metric of the one or more metrics 214A. Details about the first multiplicative relationship determination operation are provided, for example, in FIG. 1 and FIG. 3B.

At 910, the second metric is modified based on the determination of the presence of the first multiplicative relationship. In an embodiment of the disclosure, the computer system 202 modifies the second metric based on the determination of the presence of the second multiplicative relationship. Details about the second metric modification are provided, for example, in FIG. 3B.

At 912, the first portion of the training dataset (the first training dataset 216) is generated based on the modified second metric. The first portion of the training dataset (the first training dataset 216) is exclusive of the first metric. In an embodiment of the disclosure, the computer system 202 generates the first portion of the training dataset (the first training dataset 216) based on the modified second metric. The first portion of the training dataset (the first training dataset 216) is exclusive of the first metric. Details about the first portion generation operation are provided, for example, in FIG. 1 and FIG. 3B.

At 914, the first ML model 208 is trained based on the first portion of the training dataset (the first training dataset 216). The first ML model 208 is trained to predict the first value of the first metric. In an embodiment of the disclosure, the computer system 202 trains the first ML model 208 based on the first portion of the training dataset (the first training dataset 216). The first ML model 208 is trained to predict the first value of the first metric. Details about the training of the first ML model 208 are provided in, for example, FIG. 4A and FIG. 4B.

At 916, the trained first ML model 208 is outputted. In an embodiment of the disclosure, the computer system 202 outputs the trained first ML model 208. Details about the trained first ML model output operation are provided, for example, in FIG. 1, FIG. 4A and FIG. 4B.

The descriptions of the various embodiments of the disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable people of ordinary skill in the art to understand the embodiments disclosed herein.

What is claimed is:

1. A computer-implemented method, comprising:

retrieving, by a computer, first input data comprising metrics associated with one or more user devices;

applying, by the computer, one or more rules on the first input data;

classifying, by the computer, the first input data into a set of groups based on the application of the one or more rules on the first input data;

determining, by the computer based on the set of groups, a presence of a first multiplicative relationship between a first metric of the metrics and a second metric of the metrics;

modifying, by the computer, the second metric based on the determination of the presence of the first multiplicative relationship;

generating, by the computer, a first portion of a first training dataset based on the modified second metric, wherein the first portion of the first training dataset is exclusive of the first metric;

training, by the computer, a first machine learning (ML) model based on the first portion of the first training dataset, wherein the generation of the first portion of the first training dataset using the modified second metric reduces a training time of the first ML model for identifying patterns and relationships among the metrics; and outputting, by the computer, the trained first ML model.

2. The computer-implemented method of claim 1, wherein the trained first ML model is trained to predict a first value of the first metric.

3. The computer-implemented method of claim 2, further comprising:

predicting, by the computer, the first value of the first metric based on the trained first ML model;

determining, by the computer, a first variance value for the trained first ML model based on the predicted first value of the first metric and a second value of the first metric;

comparing, by the computer, the first variance value with a variance threshold;

determining, by the computer, the first variance value is less than or equal to the variance threshold based on the comparing; and outputting, by the computer, the trained first ML model based on the determination that the first variance value is less than or equal to the variance threshold.

4. The computer-implemented method of claim 3, further comprising:

determining, by the computer, based on the set of groups and the determination that the first variance value is greater than the variance threshold, a presence of a second multiplicative relationship between the second metric of the metrics and a third metric of the metrics;

modifying, by the computer, the third metric based on the determination of the presence of the second multiplicative relationship;

generating, by the computer, a second portion of the first training dataset based on the modified third metric, wherein the second portion of the first training dataset is exclusive of the second metric; and training, by the computer, the trained first ML model based on the second portion of the first training dataset to predict a third value of the second metric.

5. The computer-implemented method of claim 4, further comprising:

predicting, by the computer, the third value of the second metric based on the trained first ML model;

determining, by the computer, a second variance value for the trained first ML model based on the predicted third value of the second metric and a fourth value of the second metric;

determining, by the computer, the second variance value is less than or equal to the variance threshold; and outputting, by the computer, the trained first ML model based on the determination that the second variance value is less than or equal to the variance threshold.

6. The computer-implemented method of claim 5, further comprising:

determining, by the computer, the second variance value is greater than the first variance value; and outputting, by the computer, the trained first ML model based on the determination that the second variance value is greater than the first variance value.

7. The computer-implemented method of claim 2, further comprising:

receiving, by the computer, second input data comprising at least one metric associated with a specific user device, wherein the one or more-metrics are inclusive of the at least one metric, and wherein the one or more user devices are inclusive of the specific user device;

identifying, by the computer, one or more missing values in the second input data;

applying, by the computer, the trained first ML model to the second input data;

generating, by the computer, modified second input data based on the application of the trained first ML model to the second input data, wherein the modified second input data comprises one or more values corresponding to the one or more missing values; and outputting, by the computer, the modified second input data.

8. The computer-implemented method of claim 7, further comprising:

applying, by the computer, a second ML model to the modified second input data;

detecting, by the computer, an anomaly associated with the specific user device based on the application of the second ML model to the modified second input data;

determining, by the computer, anomaly data associated with the specific user device based on the detected anomaly; and outputting, by the computer, the anomaly data.

9. The computer-implemented method of claim 8, further comprising:

retrieving, by the computer, a set of anomalies associated with each user device of the one or more user devices, wherein the set of anomalies is inclusive of the detected anomaly;

generating, by the computer, a second training dataset based on the metrics and the set of anomalies associated with each user device of the one or more user devices; and training, by the computer, the second ML model based on the second training dataset.

10. The computer-implemented method of claim 1, further comprising:

applying, by the computer, a third ML model to each group of the set of groups; and determining, by the computer, the presence of the first multiplicative relationship based on the application of the third ML model to each group of the set of groups.

11. The computer-implemented method of claim 1, further comprising:

applying, by the computer, one or more data processing operations to the first input data;

classifying, by the computer, each metric of the metrics into one of a normal metric or an abnormal metric based on the application of the one or more data processing operations; and classifying, by the computer, the first input data into the set of groups based on the normal metric.

12. The computer-implemented method of claim 1, further comprising:

determining, by the computer, the metrics are associated with a first set of metrics; and classifying, by the computer, the first input data into the set of groups based on the determination that the metrics are associated with the first set of metrics.

13. The computer-implemented method of claim 12, further comprising:

determining, by the computer, that the metrics are associated with a second set of metrics, wherein the second set of metrics is different from the first set of metrics;

determining, by the computer, a set of features associated with each metric of the metrics based on the determination that the metrics are associated with the second set of metrics, wherein the set of features comprises at least one of a transaction rate of each metric of the one er mere metrics or a type of each metric of the metrics; and classifying, by the computer, the first input data into the set of groups based on the set of features associated with each metric of the metrics.

14. A computer system, comprising:

a processor set;

one or more computer-readable storage media; and program instructions stored on the one or more computer-readable storage media, the program instructions executable by the processor set to cause the processor set to:

retrieve first input data that comprises metrics associated with one or more user devices;

apply one or more rules on the first input data;

classify the first input data into a set of groups based on the application of the one or more rules on the first input data;

determine, based on the set of groups, a presence of a first multiplicative relationship between a first metric of the metrics and a second metric of the metrics;

modify the second metric based on the determination of the presence of the first multiplicative relationship;

generate a training dataset based on the modified second metric, wherein the training dataset is exclusive of the first metric;

train a first machine learning (ML) model based on the training dataset, wherein the first ML model is trained to predict a first value of the first metric, and the generation of the training dataset using the modified second metric reduces a training time of the first ML model for identifying patterns and relationships among the metrics; and output the trained first ML model.

15. The computer system of claim 14, wherein the program instructions further cause the processor set to:

receive second input data that comprises at least one metric associated with a specific user device, wherein the metrics are inclusive of the at least one metric, and wherein the one or more user devices are inclusive of the specific user device;

identify one or more missing values in the second input data;

apply the trained first ML model to the second input data;

generate modified second input data based on the application of the trained first ML model to the second input data, the modified second input data comprises one or more values corresponding to the one or more missing values; and output the modified second input data.

16. The computer system of claim 15, wherein the program instructions further cause the processor set to:

apply a second ML model to the modified second input data;

detect an anomaly associated with the specific user device based on the application of the second ML model to the modified second input data;

determine anomaly data associated with the specific user device based on the detected anomaly; and output the anomaly data.

17. The computer system of claim 14, wherein the program instructions further cause the processor set to:

apply a third ML model to each group of the set of groups; and determine the presence of the first multiplicative relationship based on the application of the third ML model to each group of the set of groups.

18. The computer system of claim 14, wherein the program instructions further cause the processor set to:

determine that the metrics are associated with a first set of metrics; and classify the first input data into the set of groups based on the determination that the metrics are associated with the first set of metrics.

19. The computer system of claim 18, wherein the program instructions further cause the processor set to:

determine that the metrics are associated with a second set of metrics, wherein the second set of metrics is different from the first set of metrics;

determine a set of features associated with each metric of the metrics based on the determination that the metrics are associated with the second set of metrics, wherein the set of features comprises at least one of a transaction rate of each metric of the metrics or a type of each metric of the metrics; and classify the first input data into the set of groups based on the set of features associated with each metric of the metrics.

20. A computer-program product, comprising:

a processor set;

one or more computer-readable storage media; and program instructions stored on the one or more computer-readable storage media, which when executed by the processor set, cause the processor set to perform operations comprising:

retrieving first input data that comprises metrics associated with one or more user devices;

applying one or more rules on the first input data;

classifying the first input data into a set of groups based on the application of the one or more rules on the first input data;

determining, based on the set of groups, a presence of a first multiplicative relationship between a first metric of the metrics and a second metric of the metrics;

modifying the second metric based on the determination of the presence of the first multiplicative relationship;

generating a first portion of a training dataset based on the modified second metric, wherein the first portion of the training dataset is exclusive of the first metric;

training a first machine learning (ML) model based on the first portion of the training dataset, wherein the generation of the first portion of the training dataset using the modified second metric reduces a training time of the first ML model for identifying patterns and relationships among the metrics; and outputting the trained first ML model.

* * * * *